(12) United States Patent
Jones et al.

(10) Patent No.: US 10,872,584 B2
(45) Date of Patent: Dec. 22, 2020

(54) PROVIDING POSITIONAL INFORMATION USING BEACON DEVICES

(71) Applicant: Curious Company, LLC, Portland, OR (US)

(72) Inventors: Anthony Mark Jones, Hillsboro, OR (US); Jessica A. F. Jones, Forest Grove, OR (US); Bruce A. Young, Le Mars, IA (US)

(*) Notice: Subject to any disclaimer, the term of this patent is extended or adjusted under 35 U.S.C. 154(b) by 0 days.

(21) Appl. No.: 16/353,847

(22) Filed: Mar. 14, 2019

(65) Prior Publication Data

US 2020/0294472 A1    Sep. 17, 2020

(51) Int. Cl.
| | | |
|---|---|---|
| *G09G 5/36* | (2006.01) | |
| *G09G 5/02* | (2006.01) | |
| *H04W 4/024* | (2018.01) | |

(52) U.S. Cl.
CPC ............. *G09G 5/363* (2013.01); *G09G 5/026* (2013.01); *H04W 4/024* (2018.02); *G09G 2340/12* (2013.01)

(58) Field of Classification Search
CPC ... G02B 27/0172; G06F 3/012; G06T 19/006; H04B 7/26; H04W 4/023
See application file for complete search history.

(56) References Cited

U.S. PATENT DOCUMENTS

| | | | |
|---|---|---|---|
| 3,861,350 A | 1/1975 | Selleck | |
| 5,309,169 A | 5/1994 | Lippert | |
| 5,815,411 A | 9/1998 | Ellenby et al. | |
| 8,520,900 B2 | 8/2013 | Rhoads et al. | |
| 8,863,039 B2 | 10/2014 | Lim et al. | |
| 8,953,841 B1 | 2/2015 | Leblang et al. | |
| 9,165,381 B2 | 10/2015 | Latta et al. | |
| 9,229,231 B2 | 1/2016 | Small et al. | |
| 9,292,096 B2 | 3/2016 | Watanabe et al. | |

(Continued)

FOREIGN PATENT DOCUMENTS

| | | |
|---|---|---|
| CN | 103697900 A | 4/2014 |
| CN | 105781618 A | 7/2016 |

(Continued)

OTHER PUBLICATIONS

Bjerregaard, Lindsay, Consilio3D Technologies Creates New Augmented Reality Inspection Product, Retrieved from http://www.mro-network.com/software/consilio3d-technologies-creates-new-augmented-reality-inspection-product on May 20, 2018.

(Continued)

*Primary Examiner* — Phuc N Doan
(74) *Attorney, Agent, or Firm* — Young's Patent Services, LLC; Bruce A Young

(57) ABSTRACT

A method to provide positional information to a user of a hybrid reality (HR) system includes receiving a signal at the HR system from a beacon device located in a real-world environment, determining a position of the beacon device based on the signal, and providing a stimulus to the user on the HR system based on the position of the beacon device. A head-mounted display (HMD) includes a display, a structure, coupled to the display and adapted to position the display in a field-of-view (FOV) of the user, and a processor, coupled to the display, the processor configured to perform the method.

13 Claims, 8 Drawing Sheets

(56) References Cited

U.S. PATENT DOCUMENTS

| | | |
|---|---|---|
| 9,852,599 B1 | 12/2017 | Slavin et al. |
| 9,911,020 B1 * | 3/2018 | Liu .................... G01S 13/74 |
| 9,928,662 B2 | 3/2018 | Palmaro |
| 9,953,216 B2 | 4/2018 | Alvarez |
| 9,978,180 B2 | 5/2018 | Margolis et al. |
| 10,065,074 B1 | 9/2018 | Hoang et al. |
| 10,134,192 B2 | 11/2018 | Tomlin et al. |
| 10,203,762 B2 | 2/2019 | Bradski et al. |
| 10,430,985 B2 | 10/2019 | Harrises et al. |
| 10,497,161 B1 | 12/2019 | Jones et al. |
| 10,528,228 B2 | 1/2020 | Seixeiro et al. |
| 10,636,197 B2 | 4/2020 | Jones |
| 10,636,216 B2 | 4/2020 | Jones et al. |
| 10,650,600 B2 | 5/2020 | Jones et al. |
| 10,706,629 B2 | 7/2020 | Boyapalle et al. |
| 10,803,668 B2 | 10/2020 | Jones et al. |
| 10,818,088 B2 | 10/2020 | Jones et al. |
| 2002/0191004 A1 | 12/2002 | Ebersole |
| 2002/0196202 A1 | 12/2002 | Bastian et al. |
| 2003/0025714 A1 | 2/2003 | Ebersole et al. |
| 2003/0210812 A1 | 11/2003 | Khamene et al. |
| 2005/0041424 A1 | 2/2005 | Ducharme |
| 2007/0045641 A1 * | 3/2007 | Yin Chua ............... H01L 33/46 |
| | | 257/98 |
| 2008/0267490 A1 | 10/2008 | Gorges et al. |
| 2008/0300854 A1 | 12/2008 | Eibye |
| 2009/0065715 A1 | 3/2009 | Wainright |
| 2009/0091237 A1 | 4/2009 | Hirosaki et al. |
| 2009/0109244 A1 | 4/2009 | Conner et al. |
| 2009/0240431 A1 | 9/2009 | Chau et al. |
| 2009/0251537 A1 | 10/2009 | Keidar et al. |
| 2010/0117828 A1 | 5/2010 | Goldman et al. |
| 2010/0302015 A1 | 12/2010 | Kipman et al. |
| 2011/0270135 A1 | 11/2011 | Dooley et al. |
| 2012/0087104 A1 | 4/2012 | Dai et al. |
| 2012/0105473 A1 | 5/2012 | Bar-Zeev et al. |
| 2012/0206452 A1 | 8/2012 | Geisner et al. |
| 2012/0249741 A1 | 10/2012 | Maciocci et al. |
| 2012/0289290 A1 | 11/2012 | Chae et al. |
| 2013/0073637 A1 | 3/2013 | Kim |
| 2013/0222371 A1 | 8/2013 | Reitan |
| 2013/0249947 A1 | 9/2013 | Reitan |
| 2013/0249948 A1 | 9/2013 | Reitan |
| 2013/0342564 A1 | 12/2013 | Kinnebrew et al. |
| 2014/0002444 A1 | 1/2014 | Bennett et al. |
| 2014/0306891 A1 | 10/2014 | Latta et al. |
| 2015/0109193 A1 | 4/2015 | Sly et al. |
| 2015/0130790 A1 | 5/2015 | Vasquez et al. |
| 2015/0243079 A1 | 8/2015 | Cho et al. |
| 2015/0263806 A1 | 9/2015 | Puscasu et al. |
| 2015/0278604 A1 | 10/2015 | Shuster et al. |
| 2015/0293592 A1 | 10/2015 | Cheong et al. |
| 2015/0325047 A1 * | 11/2015 | Conner ............... G06F 16/9554 |
| | | 345/633 |
| 2016/0003737 A1 | 1/2016 | Shimada |
| 2016/0026253 A1 | 1/2016 | Bradski et al. |
| 2016/0029143 A1 | 1/2016 | Johnson et al. |
| 2016/0147408 A1 | 5/2016 | Bevis et al. |
| 2016/0187974 A1 | 6/2016 | Mallinson |
| 2016/0248506 A1 | 8/2016 | Ryan et al. |
| 2016/0270656 A1 | 9/2016 | Samec et al. |
| 2016/0342388 A1 | 11/2016 | Imamura et al. |
| 2017/0005826 A1 | 1/2017 | Youn |
| 2017/0026560 A1 | 1/2017 | Whitehouse et al. |
| 2017/0061696 A1 * | 3/2017 | Li ............................ G06T 7/70 |
| 2017/0091998 A1 | 3/2017 | Piccolo |
| 2017/0103440 A1 | 4/2017 | Xing et al. |
| 2017/0117823 A1 | 4/2017 | Arnaud et al. |
| 2017/0169170 A1 | 6/2017 | Otin |
| 2017/0173457 A1 | 6/2017 | Rihn |
| 2017/0192091 A1 | 7/2017 | Felix |
| 2017/0193705 A1 * | 7/2017 | Mullins ................ G06T 19/006 |
| 2017/0269712 A1 * | 9/2017 | Forsblom ............ G06F 3/0346 |
| 2017/0277166 A1 | 9/2017 | Popa-Simil et al. |
| 2017/0277257 A1 | 9/2017 | Ota et al. |
| 2017/0301107 A1 | 10/2017 | Sasaki |
| 2017/0330042 A1 | 11/2017 | Vaziri |
| 2017/0330376 A1 | 11/2017 | Haseltine et al. |
| 2017/0341576 A1 | 11/2017 | Lei et al. |
| 2017/0354878 A1 | 12/2017 | Posin |
| 2017/0374486 A1 | 12/2017 | Killham et al. |
| 2018/0011676 A1 | 1/2018 | Han et al. |
| 2018/0029641 A1 | 2/2018 | Solar et al. |
| 2018/0050267 A1 | 2/2018 | Jones |
| 2018/0053394 A1 | 2/2018 | Gersten |
| 2018/0074599 A1 | 3/2018 | Garcia et al. |
| 2018/0107277 A1 | 4/2018 | Keller et al. |
| 2018/0120936 A1 | 5/2018 | Keller et al. |
| 2018/0239144 A1 * | 8/2018 | Woods .................. A63F 13/212 |
| 2018/0239417 A1 | 8/2018 | Fu et al. |
| 2018/0246698 A1 | 8/2018 | Huang |
| 2018/0261012 A1 | 9/2018 | Mullins et al. |
| 2018/0262270 A1 | 9/2018 | Maricic et al. |
| 2018/0299272 A1 | 10/2018 | Salowitz |
| 2018/0299543 A1 | 10/2018 | Lomnitz et al. |
| 2018/0303190 A1 | 10/2018 | Calilung et al. |
| 2018/0307310 A1 | 10/2018 | Mccombe et al. |
| 2018/0350221 A1 | 12/2018 | Chabra et al. |
| 2019/0007548 A1 * | 1/2019 | Sit ........................... H04W 4/80 |
| 2019/0011703 A1 | 1/2019 | Robaina et al. |
| 2019/0026592 A1 | 1/2019 | Wang et al. |
| 2019/0101978 A1 | 4/2019 | Iseringhausen et al. |
| 2019/0113207 A1 | 4/2019 | Palmer et al. |
| 2019/0114921 A1 * | 4/2019 | Cazzoli .................. G08G 1/166 |
| 2019/0116448 A1 | 4/2019 | Schmidt et al. |
| 2019/0132815 A1 | 5/2019 | Zampini et al. |
| 2019/0196578 A1 | 6/2019 | Iodice et al. |
| 2019/0199136 A1 | 6/2019 | Choi et al. |
| 2019/0271755 A1 * | 9/2019 | Peitz ........................ G01S 5/02 |
| 2019/0373395 A1 | 12/2019 | Sarkar |
| 2019/0377538 A1 | 12/2019 | Jones et al. |
| 2019/0385370 A1 | 12/2019 | Boyapalle et al. |
| 2020/0020145 A1 | 1/2020 | Jones et al. |
| 2020/0020161 A1 | 1/2020 | Jones et al. |
| 2020/0020162 A1 | 1/2020 | Jones et al. |
| 2020/0082600 A1 | 3/2020 | Jones et al. |
| 2020/0082601 A1 | 3/2020 | Jones et al. |
| 2020/0082602 A1 | 3/2020 | Jones |
| 2020/0082628 A1 | 3/2020 | Jones et al. |
| 2020/0150751 A1 | 5/2020 | Laaksonen et al. |
| 2020/0018363 A1 | 6/2020 | Boyapalle et al. |
| 2020/0183171 A1 | 6/2020 | Robaina et al. |
| 2020/0292817 A1 | 9/2020 | Jones et al. |
| 2020/0294314 A1 | 9/2020 | Jones et al. |

FOREIGN PATENT DOCUMENTS

| | | | |
|---|---|---|---|
| CN | 106828822 | * 6/2017 | ............ B63B 51/00 |
| CN | 107657662 A | 2/2018 | |
| WO | 2003060830 A1 | 7/2003 | |
| WO | 2017151778 A1 | 9/2017 | |

OTHER PUBLICATIONS

Daqri, Smart Glasses Specifications Sheet, Mar. 15, 2018, Retrieved from https://assets.daqri.com/documents/DAQRI_Smart_Glasses_Datasheet_2018.pdf on Aug. 22, 2019.

Daqri, Smart Glasses, Retrieved from https://www.daqri.com/products/smart-glasses/ on Jun. 20, 2018.

Epson, Moverio Pro BT-200/BT-300 Smart Headset, Retrieved from https://epson.com/For-Work/Wearables/Smart-Glasses/Moverio-Pro-BT-2000-Smart-Headset-/p/V11H725020 on Jun. 20, 2018.

Farsens, EPC C1G2 Batteryless Ambient Temperature and Barometric Pressure Sensor, Jan. 2018, retrieved from http://www.farsens.com/wp-content/uploads/2018/01/DS-EVAL01-FENIX-VORTEX-RM-V03.pdf on Nov. 30, 2018.

Farsnes, EPC C1G2 Batteryless LED Indicator, Jan. 2018, retrieved from http://www.farsens.com/wp-content/uploads/2018/01/DS-EVAL01-STELLA-R-V03.pdf on Nov. 30, 2018.

Laster Technologies, Laster SeeThru: The First Genuine Augmented Reality Wireless Eyewear Launches on Kickstarter, Retrieved from

(56) References Cited

OTHER PUBLICATIONS https://www.businesswire.com/news/home/20140115005387/en/LASTER-SeeThru-Genuine-Augmented-Reality-Wireless-Eyewear on Jun. 20, 2018.

Microsoft, Hololens Overview, Retrieved from https://www.microsoft.com/en-us/hololens/commercial-overview on Jun. 20, 2018.

Microsoft, Why Hololens, Retrieved from https://www.microsoft.com/en-us/hololens/why-hololens on Jun. 20, 2018.

Occulus, Rift VR Headset, Retrieved from https://www.oculus.com/rift/?utm_campaign=%5bcampaign%5d8&utm_source=google&utm_medium=cpc&gclid=Cj0KCQiAzrTUBRCnARlsAL0mqcyb5MhpYgdQ1fl2hb0CxWclg32N-e8B4Vv-zBcirW136-5JU3PAQaEaAkLaEALw_wcB&gclsrc=aw.ds on Jun. 20, 2018.

Osterhout Design Group, Smartglasses 7, Retrieved from http://www.osterhoutgroup.com/downloads/pdf/product/R-7HL-TechSheet.pdf on Jun. 20, 2018.

Phillips, Jon, Hands on with Laster SeeThru, a direct augmented-reality challenge to Google Glass, Retrieved from https://www.pcworld.com/article/2105865/hands-on-with-laster-seethru-a-direct-augmented-reality-challenge-to-google-glass.html on Jun. 22, 2018.

Polap, David, et al. "Obstacle Detection as a Safety Alert in Augmented Reality Models by the Use of Deep Learning Techniques." Sensors (Basel) (2017). Retrieved from https://www.ncbi.nlm.nih.gov/pmc/articles/PMC5751448/ on Jun 20, 2018.

Singularity Hub Staff, This Augmented Reality Helmet Helps Firefighters See Through Smoke to Save Lives, Retrieved from https://singularityhub.com/2017/06/28/this-augmented-reality-helmet-helps-firefighters-see-through-smoke-to-save-lives/#sm.00013g1l63cseeyjw2l1fob4gx02f on Jun. 20, 2018.

Upskill, Comm industrial equipment manufacturing use cases, Retrieved from https://upskill.io/skylight/industries/industrial-equipment/ on Jun. 20, 2018.

Upskill, Getting the Torque Just Right with Skylight Could Save Millions, Retrieved from https://upskill.io/landing/ge-aviation-case-study/ on Jun. 20, 2018.

USPTO, Final Office Action in Related Matter U.S. Appl. No. 16/007,204, dated May 17, 2019.

USPTO, Non-Final Office Action in Related Matter U.S. Appl. No. 16/007,204, dated Dec. 10, 2018.

VIVE, HTC VIVE PRO, Retrieved from https://www.vive.com/us/vive-pro-vr/?gclid=CjwKCAjwlcXXBRBhEiwApfHGTZTvHInsmDrpO7DC7pDJaBzlpsbG7a-U2iWrGgBpoiwc07DoRYThaxoCLVMQAvD_BwE on Jun. 20, 2018.

Xiang et al., Object Detection by 3D Aspectlets and Occlusion Reasoning, 4th International IEEE Workshop on 3D Representation and Recognition (3dRR), 2013.

Young, Bruce, Response to Final Office Action in Related Matter U.S. Appl. No. 16/007,204, dated Jul. 17, 2019.

Young, Bruce, Response to Non-Final Office Action in Related Matter U.S. Appl. No. 16/007,204, dated Mar. 11, 2019.

Polap, Dawid, et al., Obstacle Detection as a Safety Alert in Augmented Reality Models by the Use of Deep Learning Techniques, Sensors (Basil), Dec. 4, 2017.

USPTO, Final Office Action in related case U.S. Appl. No. 16/135,175, dated Jan. 27, 2019.

USPTO, Final Office Action in Related Matter U.S. Appl. No. 16/135,198, dated Jan. 29, 2020.

USPTO, Final Office Action in Related Matter U.S. Appl. No. 16/123,543, dated Jan. 16, 2020.

USPTO, Final Office Action in Related Matter U.S. Appl. No. 16/135,119, dated Jan. 24, 2020.

USPTO, Non-Final Office Action in Related Matter U.S. Appl. No. 16/135,175, Oct. 23, 2019.

USPTO, Non-Final Office Action in Related Matter U.S. Appl. No. 16/135,198, dated Nov. 20, 2019.

USPTO, Non-Final Office Action in Related Matter U.S. Appl. No. 16/135,214, dated Dec. 19, 2019.

USPTO, Non-Final Office Action in Related Matter U.S. Appl. No. 16/007,335, dated Sep. 6, 2019.

USPTO, Non-Final Office Action in Related Matter U.S. Appl. No. 16/031,797, dated Oct. 9, 2019.

USPTO, Non-Final Office Action in Related Matter U.S. Appl. No. 16/0311,772, dated Oct. 1, 2019.

USPTO, Non-Final Office Action in Related Matter U.S. Appl. No. 16/123,543, dated Oct. 9, 2019.

USPTO, Non-Final Office Action in Related Matter U.S. Appl. No. 16/135,119, dated Oct. 17, 2019.

USPTO, Notice of Allowance for U.S. Appl. No. 16/0007,204, dated Sep. 6, 2018.

Young, Bruce, Response to non-Final Office Action in Related Matter U.S. Appl. No. 16/007,335, dated Jan. 2, 2020.

Young, Bruce, Response to non-Final Office Action in Related Matter U.S. Appl. No. 16/031,772, dated Dec. 18, 2019.

Young, Bruce, Response to non-Final Office Action in Related Matter U.S. Appl. No. 16/0331,797, dated Jan. 6, 2020.

Young, Bruce, Response to non-Final Office Action in Related Matter U.S. Appl. No. 16/123,543, dated Jan. 3, 2020.

Young, Bruce, Response to non-Final Office Action in Related Matter U.S. Appl. No. 16/135,119, dated Jan. 6, 2020.

Young, Bruce, Response to non-Final Office Action in Related Matter U.S. Appl. No. 16/135,175, dated Jan. 6, 2020.

Young, Bruce, Response to non-Final Office Action in Related Matter U.S. Appl. No. 16/135,198, dated Jan. 9, 2020.

Young, Bruce, Response to non-Final Office Action in Related Matter U.S. Appl. No. 16/135,214, dated Jan. 9, 2020.

Fink, AR Gesture Control Arrives, Consumer Tech, Sep. 8, 2017, pp. 1-5.

Kilkmeier, et al., With a Little Help from a Holographic Friend: The Open Impress Mixed Reality Telepresence Toolkit for Remote Collaboration Systems, Proceedings of the 24th ACM Symposium on Virtual Reality Software and Technology, Nov. 28, 2018, pp-1-11.

Kim, et al., Real-Time Human Pose Estimation and Gesture Recognition from Depth Images Using Superpixels and SVM Classifier, Sensors, Jun. 2015, (6):12410-27.

Le Chenechal, et al. Vishnu: Virtual Immersive Support for HelpiNg Users, 2016 IEEE Third VR International Workshop on Collaborative Virtual Environments (3DCVE), Mar. 20, 2016 (p. 9-12) IEEE.

Palladino, Disney Research Creates Avatars That Can Strike a Pose to Match a Person's Movements in Augmented Reality, Jul. 23, 2018 https://next.reality.news/news/disney-research-creates-avatars-can-strike-pose-match-persons-movements-augmented-reality-0186149/.

Pandey, et al., Real-Time Egocentric Gesture Recognition on Mobile Head Mounted Displays, arXiv preprint arXiv:1712:04961, Dec. 13, 2017.

Piumsomboon, et al., Exploring Enhancements for Remote Mixed Reality Collaboration, Siggragh Asia 2017 Mobile Graphics & Interactive Applications, 22/27/2017, pp. 1-5.

Piumsomboon, et al., Mini-Me An Adaptive Avatar for Mixed Reality Remote Collaboration, CHI 2018, Feb. 21, 2018.

USPTO, Final Office Action in Related Matter U.S. Appl. No. 16/007,335, dated Apr. 28, 2020.

USPTO, Non-Final Office Action in Related Matter U.S. Appl. No. 16/230,278, dated Feb. 21, 2020.

USPTO, Non-Final Office Action in Related Matter U.S. Appl. No. 16/208,799, dated Feb. 26, 2020.

USPTO, Non-Final Office Action in Related Matter U.S. Appl. No. 16/211,061, dated Feb. 27, 2020.

USPTO, Non-Final Office Action in Related Matter U.S. Appl. No. 16/353,885, dated Mar. 18, 2020.

USPTO, Notice of Allowance in Related Matter U.S. Appl. No. 16/031,797, dated Feb. 21, 2020.

USPTO, Notice of Allowance in Related Matter U.S. Appl. No. 16/135,119, dated Feb. 10, 2020.

USPTO, Notice of Allowance in Related Matter U.S. Appl. No. 16/135,214, dated Feb. 7, 2020.

Young, Bruce, Response to Final Office Action in Related Matter U.S. Appl. No. 16/135,119, dated Jan. 31, 2020.

Elliott LR, Hill SG, Barnes M. Gesture-based controls for robots: oveniew and implications for use by Soldiers. US Army Research Laboratory Aberdeen Proving Ground United States; Jul. 1, 2016.

(56) References Cited

OTHER PUBLICATIONS

Hardesty, Larry, MIT News, Guiding robot planes with hand gestures, Mar. 14, 2012, Retrieved from http://news.mit.edu/2012/robots-hand-gestures-0314 on Jul. 21, 2020.
USPTO, Final Office Action in Related Matter U.S. Appl. No. 16/0311,772, dated Feb. 3, 2020.
USPTO, Final Office Action in Related Matter U.S. Appl. No. 16/208,799, dated Jul. 14, 2020.
USPTO, Final Office Action in Related Matter U.S. Appl. No. 16/211,061, dated Jul. 23, 2020.
USPTO, Non-Final Office Action in Related Matter U.S. Appl. No. 116/358,482, dated Apr. 9, 2020.
USPTO, Non-Final Office Action in Related Matter U.S. Appl. No. 16/353,495, dated Apr. 9, 2020.
USPTO, Non-Final Office Action in Related Matter U.S. Appl. No. 16/123,543, dated Jun. 2, 2020.
USPTO, Notice of Allowance in Related Matter U.S. Appl. No. 16/135,198, dated Jun. 5, 2020.
USPTO, Notice of Allowance in Related Matter U.S. Appl. No. 16/0311,772, dated Jun. 24, 2020.
Young, Bruce, Response to Final Office Action in Related Matter U.S. Appl. No. 16/007,335, dated Jul. 28, 2020.
Young, Bruce, Response to Final Office Action in Related Matter U.S. Appl. No. 16/031,772, dated Jun. 1, 2020.
Young, Bruce, Response to Final Office Action in Related Matter U.S. Appl. No. 16/123,543 dated May 18, 2020.
Young, Bruce, Response to Final Office Action in Related Matter U.S. Appl. No. 16/135,198, dated May 29, 2020.
Young, Bruce, Response to Final Office Action in Related Matter U.S. Appl. No. 16/211,061, dated Jun. 26, 2020.
Young, Bruce, Response to non-Final Office Action in Related Matter U.S. Appl. No. 16/123,543, dated Jul. 25, 2020.
Young, Bruce, Response to non-Final Office Action in Related Matter U.S. Appl. No. 16/135,175, dated Jun. 26, 2020.
Young, Bruce, Response to Non-Final Office Action in Related Matter U.S. Appl. No. 16/208,799, dated May 26, 2020.
Young, Bruce, Response to Non-Final Office Action in Related Matter U.S. Appl. No. 16/230,278 dated May 21, 2020.
Young, Bruce, Response to Non-Final Office Action in Related Matter U.S. Appl. No. 16/358,482, dated Aug. 10, 2020.
Young, Bruce, Response to Non-Final Office Action in Related Matter U.S. Appl. No. 16/358,495, dated Aug. 5, 2020.
Young, Bruce, Response to Non-Final Office Action in Related Matter U.S. Appl. No. 16/0353,885 dated Jun. 18, 2020.
YouTube Video, How to Convert a selection into a layer mask in Photoshop CS6 | lynda.com, played from https://www.youtube.com/watch?v=3F4XUS45MUk on Jun. 2, 2020, Uploaded to YouTube on Jun. 15, 2015, Transcript and Screenshots submitted.
USPTO, Final Office Action in Related Matter U.S. Appl. No. 16/353,885, dated Sep. 10, 2020.
USPTO, Non-Final Office Action in Related Matter U.S. Appl. No. 16/208,799, dated Oct. 2, 2020.
USPTO, Notice of Allowance in Related Matter U.S. Appl. No. 16/358,495, dated Sep. 21, 2020.
USPTO, Notice of Allowance in Related Matter U.S. Appl. No. 16/123,543, dated Sep. 16, 2020.
Young, Bruce, Response to Final Office Action in Related Matter U.S. Appl. No. 16/208,799, dated Sep. 17, 2020.
Young, Bruce, Response to Final Office Action in Related Matter U.S. Appl. No. 16/211,061, dated Sep. 17, 2020.
Young, Bruce, Response to Final Office Action in Related Matter U.S. Appl. No. 16/230,278 dated Oct. 21, 2020.
Young, Bruce, Response to Final Office Action in Related Matter U.S. Appl. No. 16/353,885 dated Nov. 6, 2020.
Young, Bruce, Supplemental Amendment in Related Matter U.S. Appl. No. 16/358,482, dated Aug. 28, 2020.
Young, Bruce, Supplemental Response in Related Matter U.S. Appl. No. 16/358,495, dated Aug. 26, 2020.

* cited by examiner

PROVIDING POSITIONAL INFORMATION USING BEACON DEVICES

BACKGROUND

Technical Field

The present subject matter relates to using low-cost autonomous devices which may be deployed during a transit. The devices include various modes of signaling to aid tracing a path.

Background Art

Many situations require the presentation information to a user in a way that the user can receive the information when it is needed and ensures that the user acts accordingly. One of many different professions where this is important is for emergency responders where the ability to receive the right information at the right time can be a matter of life or death. Traditionally, emergency responders have relied on audio transmissions over a radio for a majority of their information, but that is changing with the advent of widespread wireless digital communication.

Another new technology that is making its way into the world of emergency responders is digital displays. These displays may be on a handheld device, such as a mobile phone, or on a head-mounted display (HMD), such as a virtual reality (VR) display or an augmented reality (AR) display, which may be integrated into their emergency equipment, such as their helmet. Textual information can be presented to the emergency responder through the display and the information can be updated in real-time through the digital wireless interface from a command center or other information sources.

BRIEF DESCRIPTION OF THE DRAWINGS

The accompanying drawings, which are incorporated in and constitute part of the specification, illustrate various embodiments. Together with the general description, the drawings serve to explain various principles. In the drawings.

DETAILED DESCRIPTION

Figure 1A:
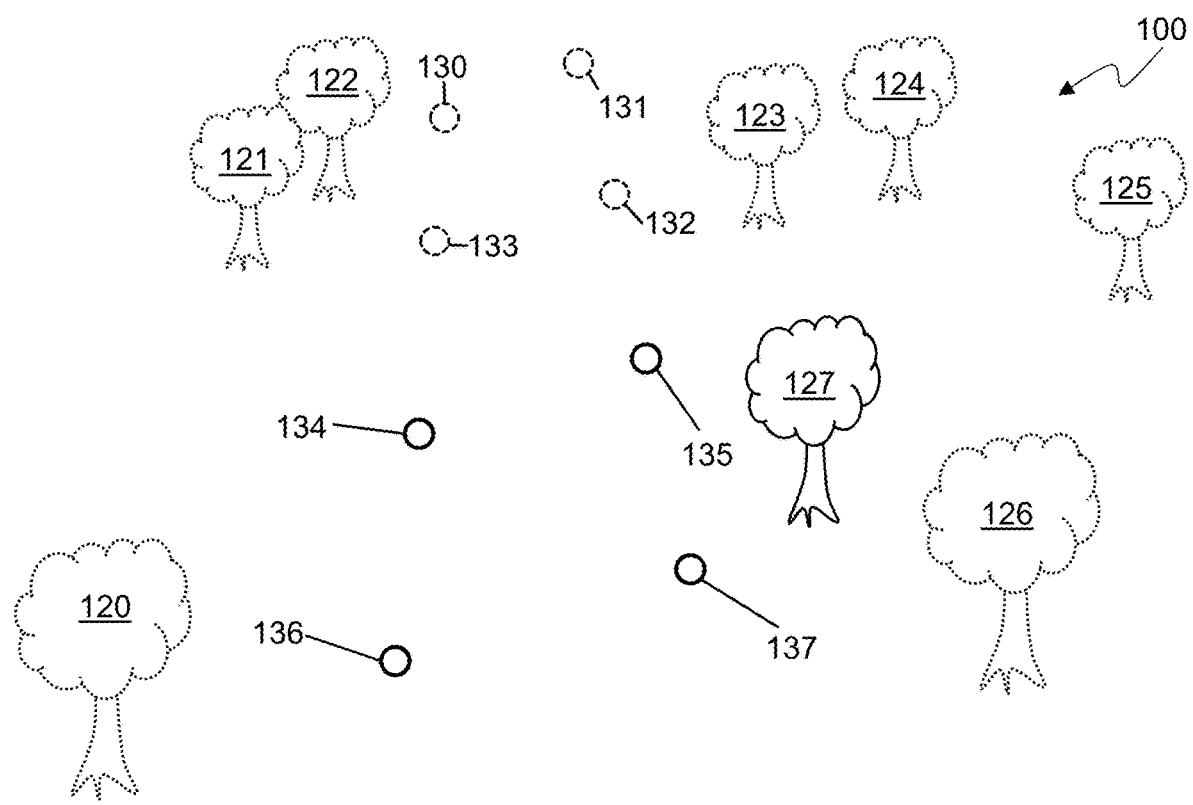
FIG. 1A shows an obscured scene and FIG. 1B shows a rendering on an embodiment of an HR display presenting a path.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures and components have been described at a relatively high-level, without detail, in order to avoid unnecessarily obscuring aspects of the present concepts. A number of descriptive terms and phrases are used in describing the various embodiments of this disclosure. These descriptive terms and phrases are used to convey a generally agreed upon meaning to those skilled in the art unless a different definition is given in this specification. Some descriptive terms and phrases are presented in the following paragraphs for clarity.

Hybrid Reality (HR), as the phrase is used herein, refers to an image that merges real-world imagery with imagery created in a computer, which is sometimes called virtual imagery. While an HR image can be a still image, it can also be a moving image, such as imagery created using a video stream. HR can be displayed by a traditional two-dimensional display device, such as a computer monitor, one or more projectors, or a smartphone screen. HR imagery can also be displayed by a head-mounted display (HMD). Many different technologies can be used in an HMD to display HR imagery. A virtual reality (VR) HMD system may receive images of a real-world object, objects, or scene, and composite those images with a virtual object, objects, or scene to create an HR image. An augmented reality (AR) HMD system may present a virtual object, objects, or scene on a transparent screen which then naturally mixes the virtual imagery with a view of a scene in the real-world. A display which mixes live video with virtual objects is sometimes denoted AR, but for the purposes of this disclosure, an AR HMD includes at least a portion of the display area that is transparent to allow at least some of the user's view of the real-world to be directly viewed through the transparent portion of the AR HMD. The display used by an HR system represents a scene which is a visible portion of the whole environment. As used herein, the term "scene" and "field of view" (FOV) are used to indicate what is visible to a user.

The word "occlude" is used herein to mean that a pixel of a virtual element is mixed with an image of another object to change the way the object is perceived by a viewer. In a VR HMD, this can be done through use of a compositing process to mix the two images, a Z-buffer technique to remove elements of the image that are hidden from view, a painter's algorithm to render closer objects later in the rendering process, or any other technique that can replace a pixel of the image of the real-world object with a different pixel value generated from any blend of real-world object pixel value and an HR system determined pixel value. In an AR HMD, the virtual object occludes the real-world object if the virtual object is rendered, transparently or opaquely, in the line of sight of the user as they view the real-world object. In the following description, the terms "occlude," "transparency," "rendering" and "overlay" are used to denote the mixing or blending of new pixel values with existing object pixel values in an HR display.

In some embodiments of HR systems, there are sensors which provide the information used to render the HR imagery. A sensor may be mounted on or near the display, on the viewer's body, or be remote from the user. Remote sensors may include, but are not limited to, fixed sensors attached in an environment, sensors attached to robotic extensions, sensors attached to autonomous or semi-autonomous drones, or sensors attached to other persons. Data from the sensors may be raw or filtered. Data from the sensors may be transmitted wirelessly or using a wired connection.

Sensors used by some embodiments of HR systems include, but are not limited to, a camera that captures images in the visible spectrum, an infrared depth camera, a microphone, a sound locator, a Hall effect sensor, an air-flow meter, a fuel level sensor, an oxygen sensor, an electronic nose, a gas detector, an anemometer, a mass flow sensor, a Geiger counter, a gyroscope, an infrared temperature sensor, a flame detector, a barometer, a pressure sensor, a pyrometer, a time-of-flight camera, radar, or lidar. Sensors in some HR system embodiments that may be attached to the user include, but are not limited to, a biosensor, a biochip, a heartbeat sensor, a pedometer, a skin resistance detector, or skin temperature detector.

The display technology used by an HR system embodiment may include any method of projecting an image to an eye. Conventional technologies include, but are not limited to, cathode ray tube (CRT), liquid crystal display (LCD), light emitting diode (LED), plasma, or organic LED (OLED) screens, or projectors based on those technologies or digital micromirror devices (DMD). It is also contemplated that virtual retina displays, such as direct drawing on the eye's retina using a holographic grating, may be used. It is also contemplated that direct machine to brain interfaces may be used in the future.

The display of an HR system may also be an HMD or a separate device, such as, but not limited to, a hand-held mobile phone, a tablet, a fixed monitor or a TV screen.

The connection technology used by an HR system may include any physical link and associated protocols, such as, but not limited to, wires, transmission lines, solder bumps, near-field connections, infra-red connections, or radio frequency (RF) connections such as cellular, satellite or Wi-Fi® (a registered trademark of the Wi-Fi Alliance). Virtual connections, such as software links, may also be used to connect to external networks and/or external compute.

In many HR embodiments, aural stimuli and information may be provided by a sound system. The sound technology may include monaural, binaural, or multi-channel systems. A binaural system may include a headset or another two-speaker system but may also include systems with more than two speakers directed to the ears. The sounds may be presented as 3D audio, where each sound has a perceived position in space, achieved by using reverberation and head-related transfer functions to mimic how sounds change as they move in a particular space.

In many HR system embodiments, objects in the display may move. The movement may be due to the user moving within the environment, for example walking, crouching, turning, or tilting the head. The movement may be due to an object moving, for example a dog running away, a car coming towards the user, or a person entering the FOV. The movement may also be due to an artificial movement, for example the user moving an object on a display or changing the size of the FOV. In one embodiment, the motion may be due to the user deliberately distorting all or part of the FOV, for example adding a virtual fish-eye lens. In the following description, all motion is considered relative; any motion may be resolved to a motion from a single frame of reference, for example the user's viewpoint.

When there is motion in an HR system, the perspective of any generated object overlay may be corrected so that it changes with the shape and position of the associated real-world object. This may be done with any conventional point-of-view transformation based on the angle of the object from the viewer; note that the transformation is not limited to simple linear or rotational functions, with some embodiments using non-Abelian transformations. It is contemplated that motion effects, for example blur or deliberate edge distortion, may also be added to a generated object overlay.

In some HR embodiments, images from cameras, whether sensitive to one or more of visible, infra-red, or microwave spectra, may be processed before algorithms are executed. Algorithms used after image processing for embodiments disclosed herein may include, but are not limited to, object recognition, motion detection, camera motion and zoom detection, light detection, facial recognition, text recognition, or mapping an unknown environment. The image processing may also use conventional filtering techniques, such as, but not limited to, static, adaptive, linear, non-linear, and Kalman filters. Deep-learning neural networks may be trained in some embodiments to mimic functions which are hard to create algorithmically. Image processing may also be used to prepare the image, for example by reducing noise, restoring the image, edge enhancement, or smoothing.

In some HR embodiments, objects may be detected in the FOV of one or more cameras. Objects may be detected by using conventional algorithms, such as, but not limited to, edge detection, feature detection (for example surface patches, corners and edges), greyscale matching, gradient matching, pose consistency, or database look-up using geometric hashing. Genetic algorithms and trained neural networks using unsupervised learning techniques may also be used in embodiments to detect types of objects, for example people, dogs, or trees.

In embodiments of an HR system, object may be performed on a single frame of a video stream, although techniques using multiple frames are also envisioned. Advanced techniques, such as, but not limited to, Optical Flow, camera motion, and object motion detection may be used between frames to enhance object recognition in each frame.

After object recognition, rendering the object may be done by the HR system embodiment using databases of similar objects, the geometry of the detected object, or how the object is lit, for example specular reflections or bumps.

In some embodiments of an HR system, the locations of objects may be generated from maps and object recognition from sensor data. Mapping data may be generated on the fly using conventional techniques, for example the Simultaneous Location and Mapping (SLAM) algorithm used to estimate locations using Bayesian methods, or extended Kalman filtering which linearizes a non-linear Kalman filter to optimally estimate the mean or covariance of a state (map), or particle filters which use Monte Carlo methods to estimate hidden states (map). The locations of objects may also be determined a priori, using techniques such as, but not limited to, reading blueprints, reading maps, receiving GPS locations, receiving relative positions to a known point (such as a cell tower, access point, or other person) determined using depth sensors, WiFi time-of-flight, or triangulation to at least three other points.

Gyroscope sensors on or near the HMD may be used in some embodiments to determine head position and to generate relative motion vectors which can be used to estimate location.

In embodiments of an HR system, sound data from one or microphones may be processed to detect specific sounds. Sounds that might be identified include, but are not limited to, human voices, glass breaking, human screams, gunshots, explosions, door slams, or a sound pattern a particular machine makes when defective. Gaussian Mixture Models and Hidden Markov Models may be used to generate statistical classifiers that are combined and looked up in a database of sound models. One advantage of using statistical classifiers is that sounds can be detected more consistently in noisy environments.

In some embodiments of an HR system, eye tracking of one or both viewer's eyes may be performed. Eye tracking may be used to measure the point of the viewer's gaze. In an HMD, the position of each eye is known, and so there is a reference frame for determining head-to-eye angles, and so the position and rotation of each eye can be used to estimate the gaze point. Eye position determination may be done using any suitable technique and/or device, including, but not limited to, devices attached to an eye, tracking the eye position using infra-red reflections, for example Purkinje images, or using the electric potential of the eye detected by electrodes placed near the eye which uses the electrical field generated by an eye independently of whether the eye is closed or not.

In some HR embodiments, input is used to control the HR system, either from the user of the HR system or from external actors. The methods of input used varies by embodiment, and each input type may control any or a subset of an HR system's function. For example, in some embodiments, gestures are used as control input. A gesture may be detected by using other systems coupled to the HR system, such as, but not limited to, a camera, a stereo camera, a depth camera, a wired glove, or a controller. In some embodiments using a camera for gesture detection, the video stream is analyzed to detect the position and movement of an object, for example a hand, a finger, or a body pose. The position and motion can be used to generate a 3D or 2D path and, by using stochastic or pattern matching techniques, determine the most likely gesture used.

In another example embodiment, the user's head position and movement may be used as a gesture or direct control. The head position and movement may be determined by gyroscopes mounted into an HMD. In another example, a fixed source such as an electromagnetic beam may be affixed to a user or mounted in an HMD; coupled sensors can then track the electromagnetic beam as the user's head is moved.

In yet other example embodiments, the user may have a touch-pad or a plurality of touch sensors affixed to the body, for example built-in to a glove, a suit, or an HMD, coupled to the HR system. By touching a specific point, different input data can be generated. Note that the time of a touch or the pattern of touches may also generate different input types. In some technologies, touchless sensors using a proximity to the sensor can be used.

In some embodiments a physical input device is coupled to the HR system. The physical input device may be a mouse, a pen, a keyboard, or a wand. If a wand controller is used, the HR system tracks the position and location of the wand as well as presses of any buttons on the wand; the wand may be tracked using a camera, for example using object boundary recognition, using marker tracking where a specific shape or marker is detected in each video frame, or by wired/wireless data from the wand received by the HR system. In other example embodiments, a physical input device may be virtual, where a device is rendered on the head-mounted display and the user interacts with the virtual controller using other HR systems, such as, but not limited to, gaze direction, hand tracking, finger tracking, or gesture detection. In embodiments which use gaze direction as input, interaction with virtual menus rendered on the display may be used.

Further, in another example embodiment, a backwards-facing camera mounted in an HMD may be used to detect blinking or facial muscle movement. By tracking blink patterns or facial muscle motion, input gestures can be determined.

In some embodiments, breathing patterns may be detected using a pressure sensor mounted in a breathing system coupled to the HR system to detect changes in pressure. Breath patterns such as, but not limited to, blowing softly, exhaling hard, or inhaling suddenly may be used as input data for an HR control system.

In yet other example embodiments, sounds may be detected by one or more microphones coupled to the HR system. Specific sounds, such as, but limited to, vocalizations (e.g. scream, shout, lip buzz, snort, whistle), stamping, or clapping, may detected using stochastic or pattern matching techniques on received audio data. In some embodiments, more than one microphone may be used to place a sound in a location, allowing the position of a sound, for example a clap, to provide additional input control data. In some embodiments, voice control using natural language is used; speech recognition techniques such as trained neural networks or hidden Markov model algorithms are used by an HR system to determine what has been said.

It is anticipated that direct neural interfaces may be used in some embodiments to control an HR system.

Turning now to the current disclosure, systems that display HR imagery are becoming increasingly common and are making their way from entertainment and gaming into industrial and commercial applications. Examples of systems that may find HR imagery useful include aiding a person doing a task, for example repairing machinery, testing a system, or responding to an emergency.

Many of the same environments where HR imagery might be used also to provide information to a user defining a path. This information may be presented using many different stimuli or combinations of stimuli.

A low-cost autonomous device which may be deployed during a transit may have signaling capabilities to aid tracking or to enhance sensing capabilities of a portable computer system. The signal may include an identifier. In some embodiments one or more sensors are built-in. In some embodiments, low-power networking capability is provided. In some very-low power embodiments the signaling is only performed when a person is proximal to the device. In some high-power reusable embodiments, cameras and processing are provided. Some embodiments may also pair with a portable computer system which generates a virtual signal and/or virtual identifier. Embodiments which have no power source are contemplated.

In an HR system which aids a person doing a task, for example repairing machinery, testing a system, or responding to an emergency, there may be areas of the environment that present a potential danger, for example an unstable platform, walls, holes, and other hazards. In some environments, a hazard may become obscured by particulate matter in the atmosphere, for example smoke or water. It is well known that dangerous environments often degrade over time and so finding a safe path in and out of an environment can be challenging in at least two ways: (1) identifying hazards to be avoided, for example hazards that may have been obscured by the time to return; and (2) the available time for egress may be significantly less than the time taken to enter and set the path due to, for example, a danger level in the environment having escalated. In some environments, a safe path may be carefully determined by a leading team member, followed by other team members at pace knowing how to avoid danger and hazards.

An HR system may be used to help guide a user along a path by interacting with low-cost autonomous devices placed along the desired path. In some embodiments, the devices may be deliberately placed, for example on vertical or horizontal surfaces with or without adhesion. In some embodiments, the devices may be dropped so defining an approximate position. In some embodiments the devices may be collected and reused; in other embodiments the devices are left in the environment. As described herein, the low-cost autonomous devices are denoted as "breadcrumb beacons."

The guidance provided by a breadcrumb beacon may take any form, such as, but not limited to, visual and auditory stimuli. A stimulus may be denoted as 'present' in the environment, that is visible to the human eye or audible to the human ear; in this case the breadcrumb beacon device is generating the stimulus directly so that any person in the environment with or without HR equipment can act on the breadcrumb beacon devices' stimuli. In some cases, for example in a crowded environment, an environment where there are particulates in the atmosphere that may scatter visible light, or a noisy environment where there is ambient noise from machines or people, the 'present' stimuli may be enhanced by an HR system for example increasing the brightness or direction of a light beam or increasing the volume of an audible stimulus within a particular frequency range, thus improving the signaling effect of the breadcrumb beacon device in deleterious environments.

In other embodiments of a breadcrumb beacon device, the signal provided by the breadcrumb device may be invisible and inaudible. In this case, the HR system is responsible for detecting any stimuli and providing visible or audible cues to the HR wearer. In some embodiments, the beacon may provide guidance using invisible parts of the electromagnetic spectrum, such as infra-red, ultraviolet or radio frequency radiation; in these embodiments, any guidance received by an HR system in the invisible spectrum may be translated by the HR system into visual or auditory stimuli for its user. In some embodiments, the guidance provided by a breadcrumb beacon may include data, for example a unique identifier, location information, status information, or sensor samples.

Further, in some embodiments of a breadcrumb beacon device, the signal provided by the breadcrumb device may use a number of different frequencies, for example visible and invisible, even including audible signals. The advantages of such multi-mode signaling will be discussed in more detail below.

The signaling provided by a breadcrumb beacon device requires power to transmit. The power may be provided by an internal power source such as a battery or power supply and may also be provided by harvesting incoming transmission energies. Note that harvesting incoming energies may be used in a breadcrumb beacon device with no battery or may be used to limit power draw on a battery to extend operational lifetime during any transmission.

Signals within an environment may be generally classified by wavelength. An accepted nomenclature for electromagnetic signals in common use is: 10 nm-400 nm 'UV', 400 nm-700 nm 'Visible', 700 nm-1 mm 'IR', 1 mm-1 cm 'THF', 1 cm-10 cm 'EHF', 10 cm-1 m 'UHF', 1 m-10 m 'VHF', and 10 m+ 'RF'. Note that THF (for example Ka-band), EHF (300 GHz), UHF (3 GHz) and VHF (300 MHz) are often grouped into the broader 'RF' category. Acoustic signals generally have a wavelength between about 1.5 mm and 1.5 m with a lower speed of transmission.

In general, UV, visible, IR and RF radiation requires specific lenses or antennae to generate and focus the radiated energy. Acoustic energy is often generated by displacing air, requiring moving systems; further, acoustic signals are often detected using the displacement of a membrane, for example as in a microphone. However, acoustic systems have been used for many decades, and so are cheap and effective to generate and detect.

The general advantages of different signaling as the wavelength decreases are as follows:
  Lower power required to transmit.
  Less interference from other signals.
  Smaller and cheaper antennae.
  Less diffraction and reflection in an environment, for example from obstacles or molecules in the atmosphere.

The general disadvantages of different signaling as the wavelength decreases are as follows:
  Less range.
  Less penetration.
  More absorption, for example from atmospheric molecules.
  More propagation loss.

Acoustic energy, at essentially low frequencies of about 20 Hz to 20 kHz, is considered to have good penetration, average range and high reflectivity.

One common feature of hazardous environments is poor atmospheric conditions, for example particulate matter such as smoke (generally considered to be 12 micron particles), chemicals such as additional organic compounds (e.g. solvents such as ethanol or fuels such as butane), or water vapor from hoses or sprinklers. Each wavelength operates differently in terms of propagation in each environment; for example, thermal or FLIC cameras operate in the IR spectrum at 9 um to 14 um and so are often used in smoky environments but can be reflected by the particulate matter and so reduces the directional precision of signals. Water molecules and H—C—H bonds absorb radiation heavily between 7 um and 8 um, and so IR radiation may not be very effective in such atmospheres.

Designers of breadcrumb beacon devices may take environmental factors into consideration to determine what signaling to provide from a breadcrumb beacon device and whether and how to provide energy for a breadcrumb beacon to harvest to ensure optimal performance at lowest power.

In one example scenario, the incident energy for harvesting on a breadcrumb beacon may in the EHF spectrum, thus allowing only HR systems proximal to the beacon device to activate it. Further, the EHF energy has lower dispersion in adverse atmospheric conditions, the antenna used by the transmission system (e.g. in an HR system worn by an operator) is small and requires less power to transmit. The antenna of by the breadcrumb beacon device to harvest the incident EHF signal will also be small, allowing the device to be small and made cheaply. In this scenario, the beacon may make an audible and/or visual stimulus so that other team members without HR systems, for example people being rescued, can find the safe path defined by the breadcrumb beacons. Thus, the breadcrumb beacon may harvest invisible energy and translate that energy into visible light and audible signals.

In another scenario, the incident energy for harvesting on a breadcrumb beacon may in the IR spectrum, thus allowing more than one beacon to harvest incident energy from a single source such as an HR system worn by an operator. Using IR may also be advantageous over UV because of a reduced absorption, for example in smoke-filled rooms, and yet still able to activate more than one beacon. In this scenario, the beacon may signal using visible, audible and RF stimuli, thus allowing rescued people to follow the beacons while alerting a safety crew member wearing an HR-system to additional information via an RF band. The additional information may take the form of relayed messages left by other team members, or a countdown that was set when the breadcrumb beacon device was first activated and deployed. Thus, the breadcrumb beacon may harvest IR energy and translate that energy into visible light, audible signals and RF signals.

In yet another scenario, the incident energy for harvesting on a breadcrumb beacon may in the longer-wavelength RF spectrum, allowing more than one beacon to harvest incident energy from a single source such as an HR system worn by an operator whilst penetrating obstacles such as walls or people. In this scenario, the beacon transmits a simple light pulse to indicate its position to all people regardless of whether they are team members using an HR system, ancillary support staff (for example cleaning crew or hose operators) with no HR system or people being rescued. Thus, the breadcrumb beacon may harvest RF energy and translate that energy into visible light.

One or more example breadcrumb beacon embodiments may include an adhesive component, such as, but not limited to, a magnet, glue, or a suction pad which allows the breadcrumb beacon to be attached to a surface, thus allowing the beacon height and position to be set, In other embodiments, the breadcrumb beacon may be placed on a surface or dropped; this allows for quick deployment, but the beacon may come to rest only nearby or may be moved accidently during operation. In some embodiments, the breadcrumb beacon may be thrown or rolled into position, for example under a blocking object; note that some embodiments do not require that a beacon is visible or in a line of sight.

One or more breadcrumb beacons may be deployed by a team member to set a path. In some environments, the breadcrumb beacons may be used for re-tracing steps, but in other scenarios the deployed beacons may be used by other team members to follow a safe path or to find or join another team member. In some embodiments, the breadcrumb beacons may be deployed using robots or drones in a piloted, semi-autonomous or autonomous fashion; by using machines, human safety may be maximized in environments where hazards are yet to be determined, for example, emergency situations, undersea or on shifting terrain such as sandbanks or marshes.

Once deployed, some breadcrumb beacon embodiments may be left in the environment after use. It is contemplated that some embodiments may be constructed using green materials that degrade over time. In other embodiments, the materials used may be designed to burn at a low temperature so that fire or heat may remove any potential collateral to the environment and so reduce potential clean-up.

Once deployed, some breadcrumb beacon embodiments may be collected by the last team member using the path. In some embodiments, a beacon may transmit data to define whether collection is desirable. In some embodiments, a beacon may be magnetic, allowing the beacon to be collected using a magnetic net to speed up a retreat or to collect beacons from awkward niches or nooks in the environment.

In some embodiments, the beacons may enter a mode which transits information that allows an autonomous or semi-autonomous vehicle to detect, locate and collect a beacon automatically. It is contemplated that in some, more expensive, embodiments, a beacon may have limited motion to facilitate collection, either by a human actor or a robot/drone.

In some breadcrumb beacon embodiments, the signal transmitted by the beacon is "real," that is directly perceivable by a human, for example a light beam, a pulsing light or an intermittent sound. In some embodiments, a real signal may be enhanced by an HR system worn by a user, such as, but not limited to, increasing intensity, changing a color, or changing the signal position in the environment by placing an equivalent stimulus in a more noticeable location. The enhancement may make the beacon signal more visible, for example if the beacon signal is obscured because of smoke, water vapor, or covered by debris or other physical objects. In some embodiments, a beacon may transit an invisible signal, such as an infrared light or a radio frequency signal, either once, intermittently or continuously, which can be translated by an HR system worn by a user into a visible and/or audio cue. Continuous, as it is used herein and in the claims, refers to a relatively constant signal or stimulus over an extended period of time, such as several seconds to several minutes or more. Continuous can also refer to a relatively constant signal or stimulus being provided as long as a user is proximate to the beacon or for a time after a user was proximate. For example, the HR system may render a light shining from a beacon on an HR display; in some of these embodiments, the light may be modulated to attract attention. In some HR embodiments, the signal may be presented as one or more of a visual cue (e.g. a beam, an arrow, a bright source of light), a 3D audio cue (e.g. an alarm, a buzz, a tone), or a haptic cue (e.g. shakes in a particular direction in the headset, waves across two or more haptic pads in a suit).

In some embodiments of an HR system, the apparent position of the rendered signal may be different than the actual physical location of a breadcrumb beacon device, for example moving the HR user to avoid a physical obstruction such as debris or away from an unstable platform.

In an example embodiment, a breadcrumb beacon may also signal data, such as, but not limited to, a unique identifier, location information, status information, or samples from a sensor. In some embodiments, one or more simple sensors such as, but not limited to, an anemometer, a mass flow sensor, a noxious gas detector, an infrared temperature sensor, a flame detector, a barometer, or a pressure sensor, may be included. Embodiments may include a microphone to capture sounds which may be relayed to the user wearing the HR system to hear or may be analyzed by a computer with the results of the analysis provided to the user. Some example embodiments may have cameras built-in, which may be used to capture images or video used for analysis, either during a mission or for a post-mortem. In some embodiments with one or more mounted cameras, a camera may only be activated for a pre-determined length of time based on detecting motion in the field of view to save power and so increase potential mission times.

Some example embodiments may have an internal "high" power source, such as, but not limited to, a battery, a solar cell, a fuel cell, an electrochemical cell, or a nuclear cell. In many high-powered embodiments, the beacons have networking capabilities, allowing data to be transmitted to or from an external network; the data may be internally established, for example from sensor data, or may be received from other devices, for example other beacons or an HR system worn by a team member. Embodiments of beacons with networking capabilities may be used to create sensor arrays or to establish local networking gateways and access to devices in the environment where the beacons are deployed. In some high-power embodiments, local processing of data may be performed to balance power usage between processing and transmission.

Some example embodiments may have an internal power source, such as a battery or solar cell, which has a limited capacity. In order to conserve energy, in some embodiments signaling and capturing data from one or more sensors is triggered, for example using an external trigger signal (such as from a user of an HR system, a drone or a cell tower), or only during specific time intervals (such as a clock or counter). In some embodiments, active times may be triggered and repeated for a limited number of periods.

To dramatically reduce cost, size and power usage, some embodiments may have limited signal range and may only provide limited data. In these embodiments, the active (signaling) period is triggered only when a team member is in range; i.e. when they are proximal to the beacon. Motion detection can be performed using inexpensive, low-power Passive IR (PIR) or microwave Doppler detectors. In some embodiments, PIR and Doppler detectors can be used in tandem to increase sensitivity; a PIR detected event may be used to trigger the higher power emissive Doppler detector in tandem systems. In some environments, team members may carry tags, such as, but limited to, RFID tags, magnetic tags, tags that emit audio chirps, or tags that emit an electromagnetic pulse; proximity may be determined by a beacon embodiment that has a sensor equipped to detect a tag.

To dramatically reduce cost and size, some embodiments of breadcrumb beacons have no power source, and they are only activated by a HR system. The HR system may transmit radio waves (similar to an RFID reader), which are detected by a coiled antenna in some beacon embodiments. The antenna generates a magnetic field that is used to provide DC current used to power circuitry in the beacon which may generate and transmit a signal back to the HR system. Note that the signal from the beacon, once received, may then be rendered on an HR display or headset as if the beacon had a power source and was providing visible and/or audible stimuli into the environment. Even if non-volatile memory is provided in a beacon embodiment to store, for example, a unique ID, a zero-power beacon smaller than a grain of rice can be built. Note that the location of a beacon may be determined by time-of-flight or by taking two or more time-of-flight samples as a user of an HR system moves.

Figure 1B:
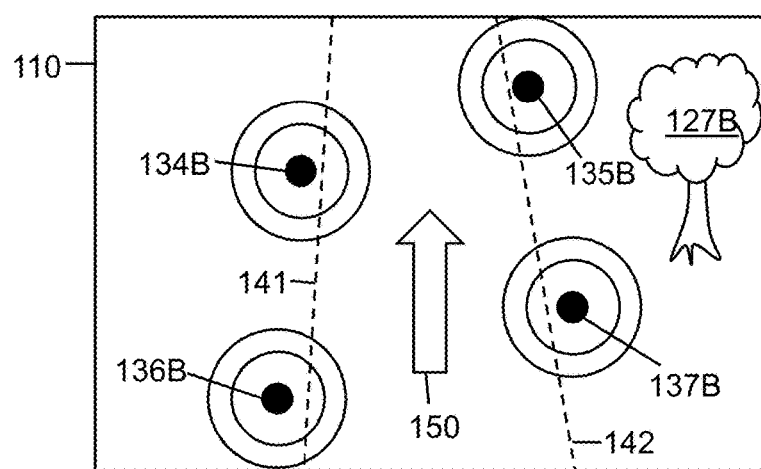

FIG. 1A shows an obscured scene 100 and FIG. 1B shows a rendering 110 of part of the scene on an embodiment of an HR display. In the scene 100 are trees 120-127; note that trees 120-127 may not be visible to the human eye because they are obscured by particulate matter such as smoke or fog. Tree 127, which is in the field of view of the HR system, is rendered as image 127B in view 110—its location and size may be detected using sensors that can penetrate the particulate matter or may be defined by data previously received or generated by the HR system. Also, in the scene are beacons 130-137 which have been previously placed; note that beacons 130, 131, 132 and 133 are not in the field of view of the HR system. Since beacons 134-137 are in the field of view, the HR system generates respective positional icons 134B-137B with a filled dot in view 110. Other embodiments may use any sort of representation for the beacons in the field of view. The position of each beacon may be determined from a signal transmitted by the beacons to the HR system; in some embodiments the signal may be triggered by the user being in proximity to beacon devices 134-137. The beacons 130-133 may be further away and so may not have yet been detected by the HR system. In some embodiments, beacons 130-133 may not yet be transmitting because the HR user is not close enough; in other embodiments, beacons 130-137 may transmit independent of the location of the user. The beacons in view 110 may be enhanced in some embodiments, for example showing radiating light as indicated in FIG. 1B as concentric circles radiating from the beacon icons 134B-137B. In at least one embodiment, the beacons 130-137 may be used to define a safe path which may be rendered in view 110 using path edges 141 and 142, along with an arrow 150 indicating a preferred direction for the user to move in. In some embodiments, only the defined path may be rendered in view 110 and the in-view beacons 134-137 may not be shown or highlighted.

Figure 2A:
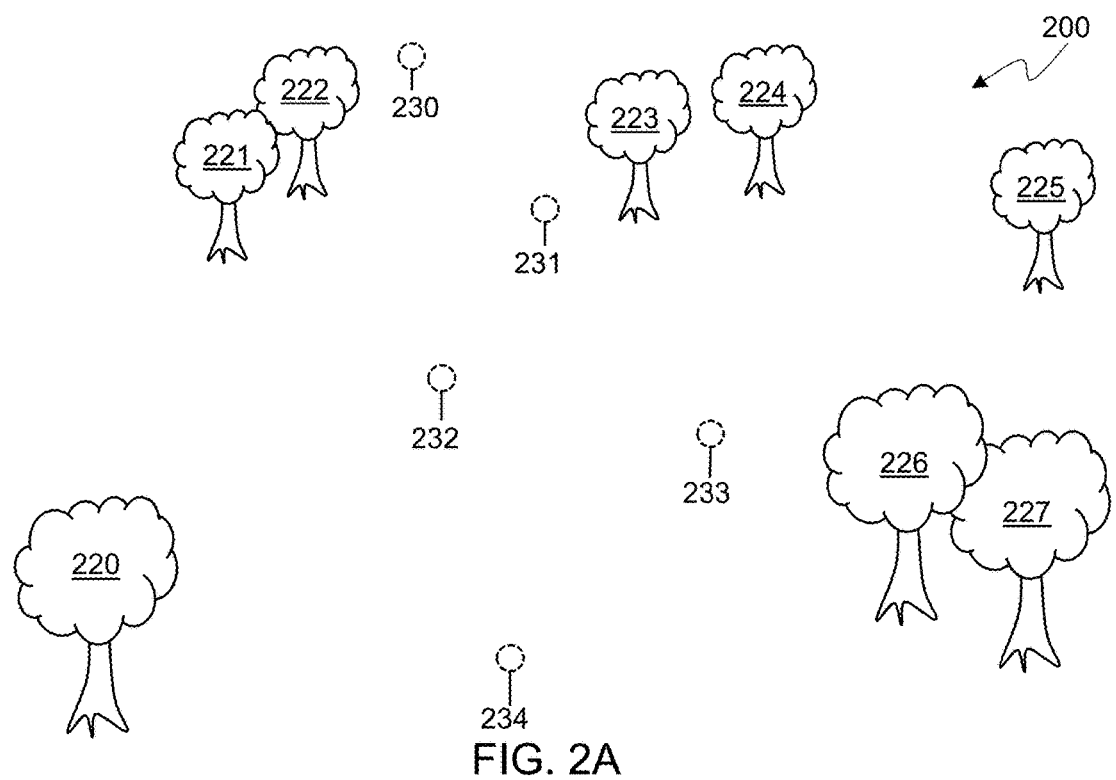
FIG. 2A shows a scene including invisible beacons.

FIG. 2A shows a scene 200 including invisible beacons 230, 231, 232, 233, 234 and visible trees 220-227. Beacons 230-234 are invisible because they do not generate a visible signal such as a beam or intermittent pulse of visible light.

Figure 2B:
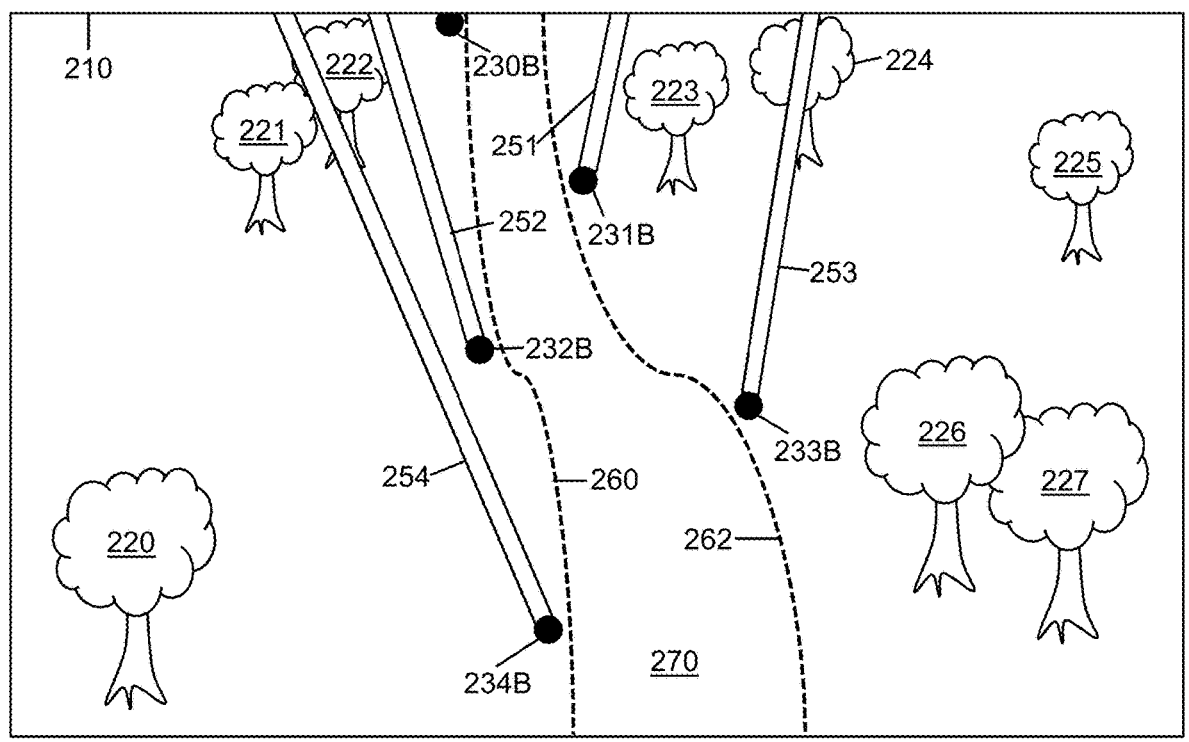
FIG. 2B shows the scene of FIG. 2A scene rendered on an embodiment of an HR display presenting a path.

FIG. 2B shows the scene 200 of FIG. 2A scene as shown on an embodiment of an HR display 210 with a transparent HR display, so that the view 210 includes the visible trees 220-227. The invisible beacons 230-234 each generate a signal received by the HR system which is used to determine the position of each beacon in 3D space. In view 210 invisible beacons 230, 231, 232, 233, 234 are rendered as respective visible beacon icons 230B, 231B, 232B, 233B, 234B. The beacon icons 230B-234B are enhanced by showing beams of virtual light 251, 252, 253, 254. The invisible beacons 230, 231, 232, 233, 234, rendered as visible beacon icons 230B, 231B, 232B, 233B, and 234B in rendered view 210, define a safe path 270 through the environment, indicated as virtual path edges 260 and 261 in FIG. 2B.

Figure 3A:
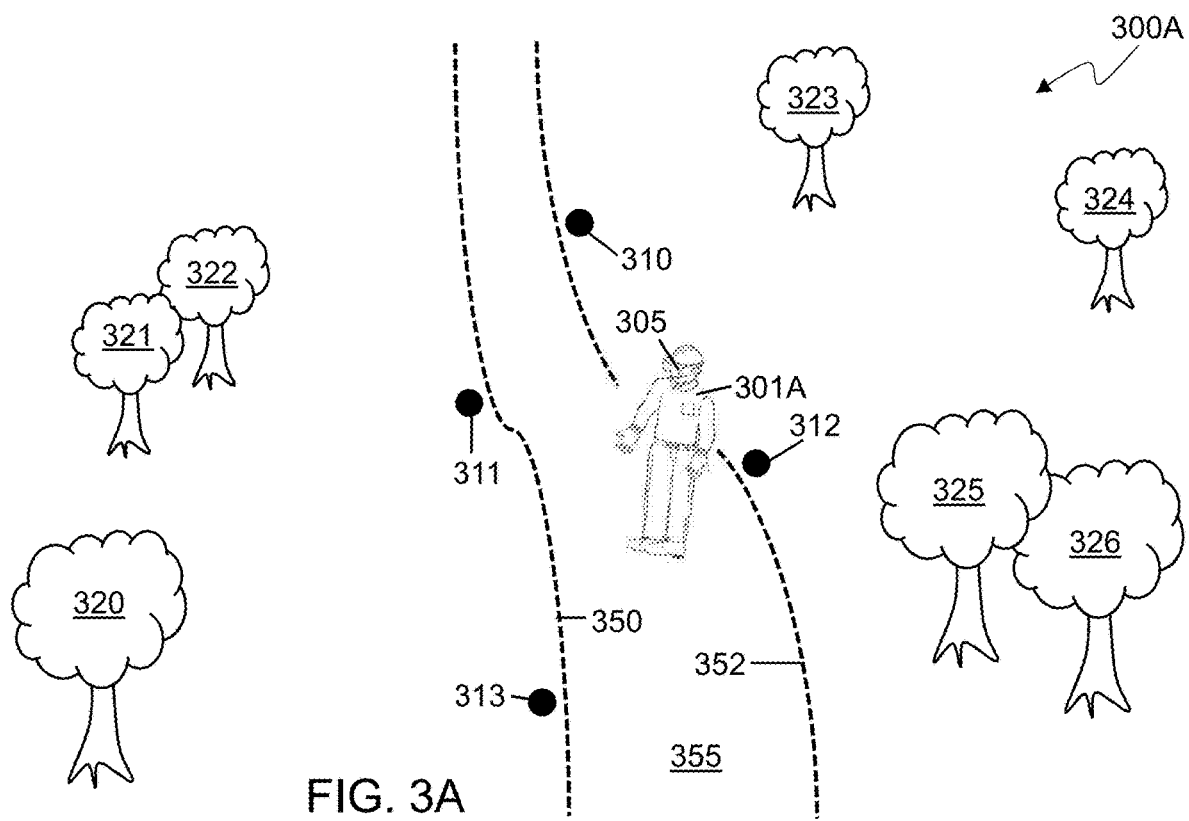
FIG. 3A shows a user of an embodiment of an HR system on a path.

FIG. 3A shows a scene 300A at a first time which includes user 301A wearing an embodiment of an HR system 305. The user 301A is on a safe path 355 at the first time shown in scene 300A. In the environment are trees 320-326 and beacons 310-313, which may each generate a signal visible in the environment or a signal which is invisible but detected by the HR system 305 worn by user 300A; if the signals generated by each of the beacons 310-313 are invisible, they may be rendered as virtual visible signals in the HR system 305 worn by user 300A. The path 355 has borders 350 and 352 defined by the position of beacons 310-313; the path may be generated as a virtual object by the HR system 305 worn by user 300A.

Figure 3B:
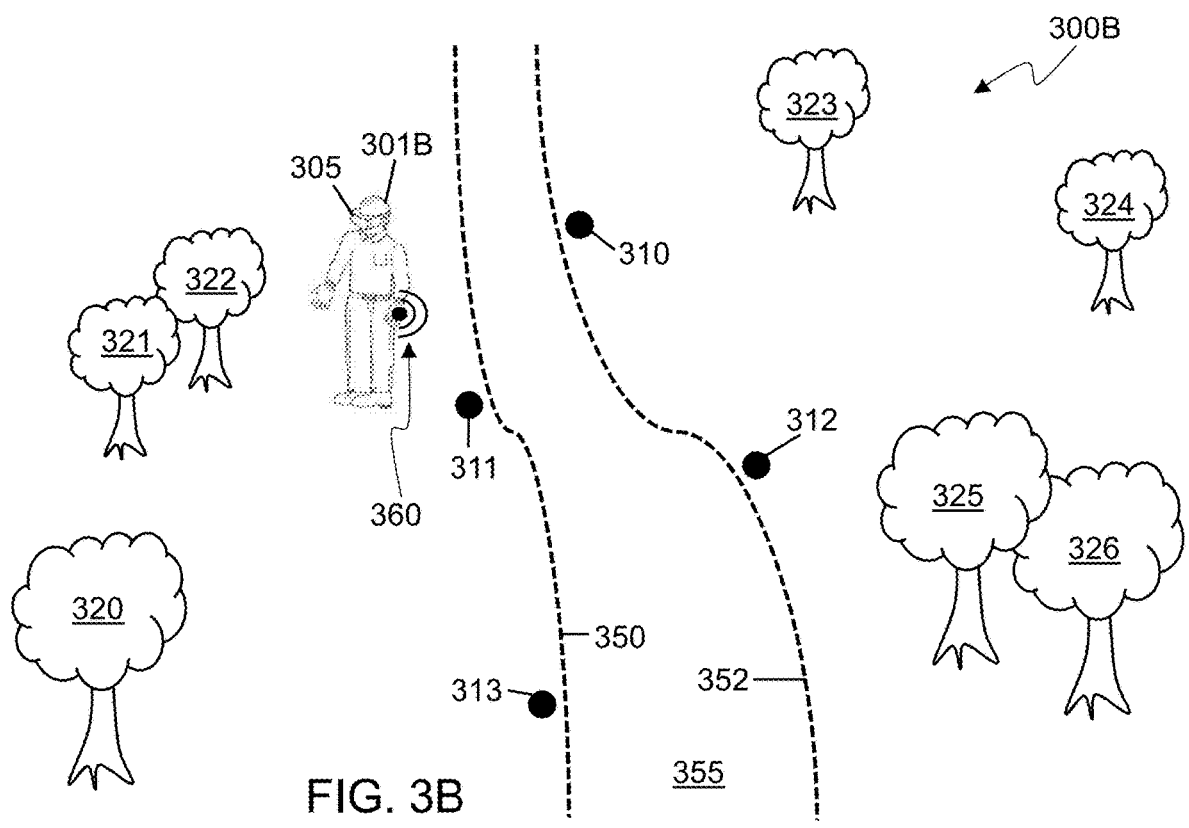
FIG. 3B shows a user of an embodiment of an HR system off of a path.

FIG. 3B shows scene 300B which is the same scene as 300A but at a second time. In the environment are trees 320-326 and beacons 310-313 which may each generate a signal visible in the environment or a signal which is invisible but detected by the HR system 305 worn by user 300B; if the signals generated by each of the beacons 310-313 are invisible, they may be rendered as virtual visible signals in the HR system 305 worn by user 300B. The path 355 has borders 350 and 352 defined by the position of beacons 310-313; the path may be generated as a virtual object by the HR system worn by user 300B. In scene 300B the user 301B is off the safe path 355. Since user 300B is off path 355, the HR system 305 may generate a haptic signal 360 indicating that user 300B should move to the left to return to the path. In some embodiments the haptic signal 360 may increase in intensity based on how far user 300B is from path 355. In at least one embodiment, the haptic signal is delivered to at least two haptic pads on user 300B to create a directional haptic stimulus 360.

Figure 4A:
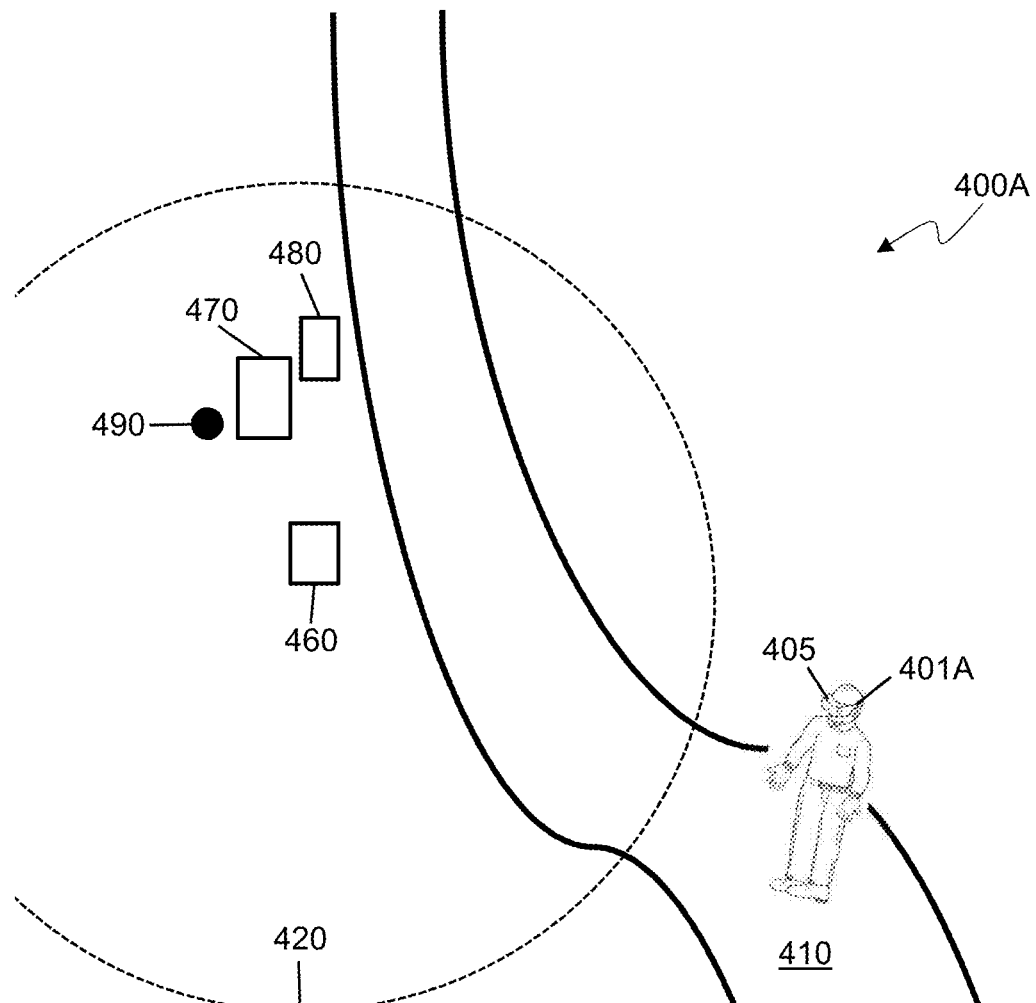
FIG. 4A shows an environment at a first time and FIG. 4B shows the scene rendered on an embodiment of an HR display at the first time.
Figure 4B:
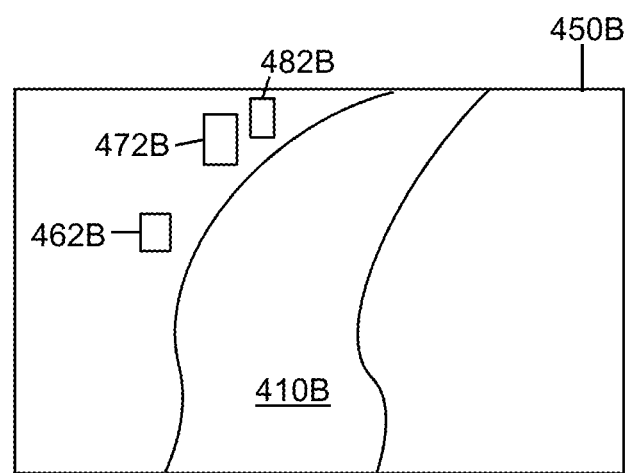

FIG. 4A shows environment 400A at a first time which includes a user 401A wearing an embodiment of an HR system 405. FIG. 4B shows view 450B of the current field of view as rendered on a display of the HR system 405. In the environment is a visible path 410, objects 460, 470, 480 and a beacon 490. Beacon 490 is configured to generate a signal only when a user is within proximal area 420 shown with a dotted line. Within view 450B, part of path 410, section 410B can be seen, along with object images 460B, 470B, and 480B which correspond with objects 460, 470 and 480 in the environment. Note that beacon 490 is not visible in view 450B because user 401A is not proximal, i.e. within dotted area 420.

Figure 4C:
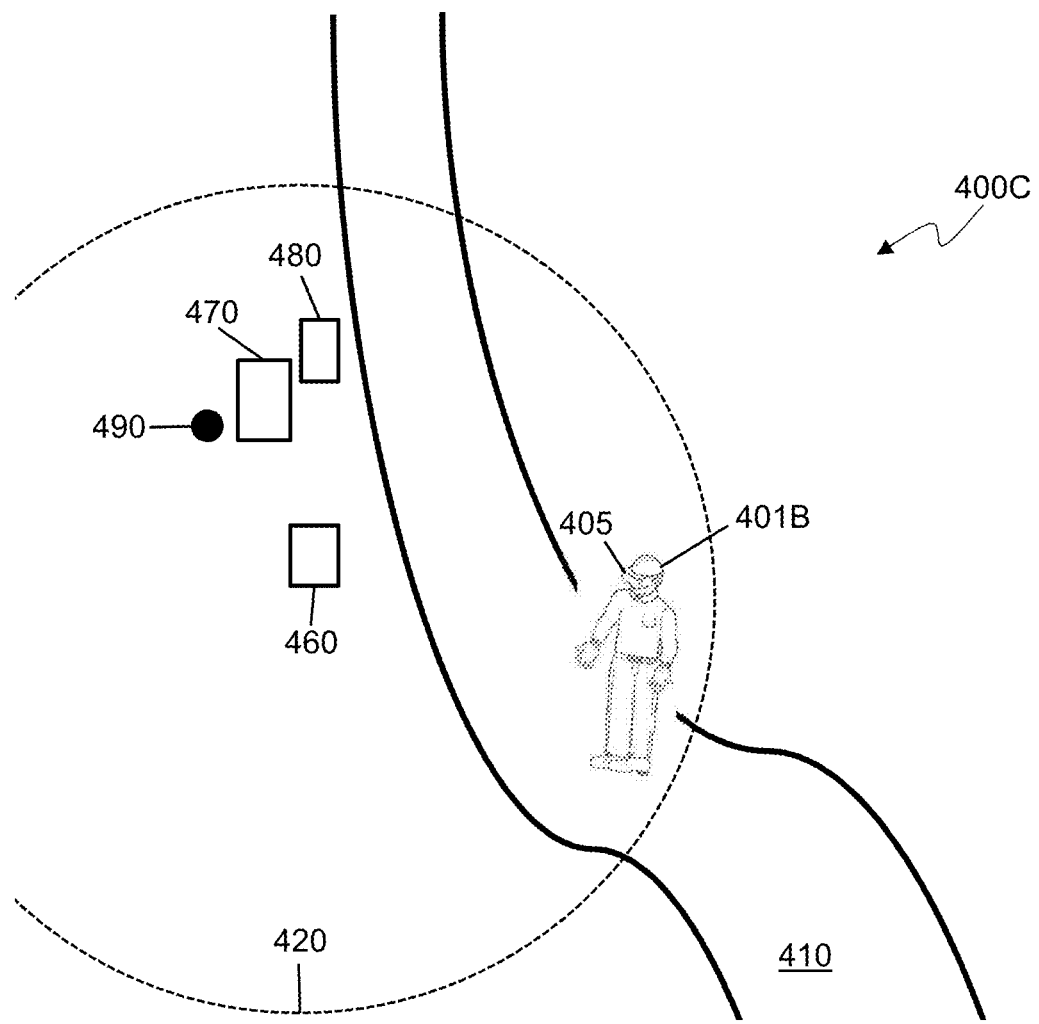
FIG. 4C shows the environment at a second time and FIG. 4D shows the scene rendered on the embodiment of an HR display at a second time when proximal to a beacon.
Figure 4D:
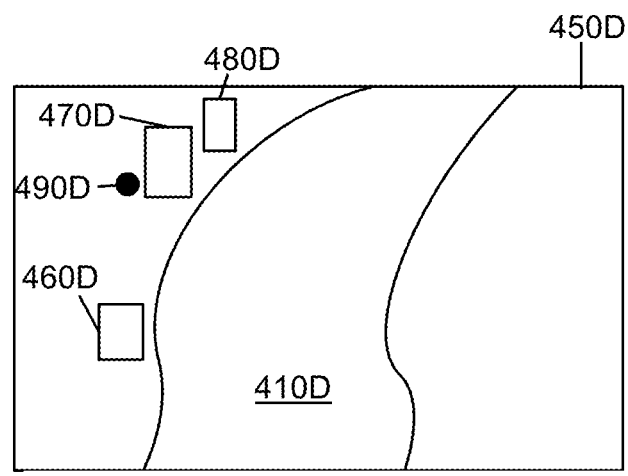

FIG. 4C shows the environment 400C, which is the same environment as shown in FIG. 4A, but at a different time when user 400B is within proximal area 420. In the environment 400C is a visible path 410, objects 460, 470, 480 and a beacon 490. Beacon 490 is configured to generate a signal only when a user is within proximal area 420 shown with a dotted line. FIG. 4D shows a view 450D which is a view of the display of the HR system 405 at the time shown in FIG. 4C. View 450D shows section 410D of path 410, along with object images 460D, 470D and 480D corresponding to objects 460, 470, 480; note that the shape and size of object images 460D, 470D and 480D are rendered differently that the object images 460B, 470B, and 480B of FIG. 4B because of the new perspective of user 401B compared to the position of user 401A of FIG. 4A. Note that beacon 490 is now rendered as icon 490D because user 401B is proximal, i.e. within dotted area 420. The presence of icon 490D in view 450D may alert user 401B, for example to collect object 470 or perform some action using or near object 470. In some embodiments, beacon 490 and its proximity to object 470 may alert user 401B to some danger near the location of beacon 490, for example alerting user 401B to not touch object 470.

Figure 5:
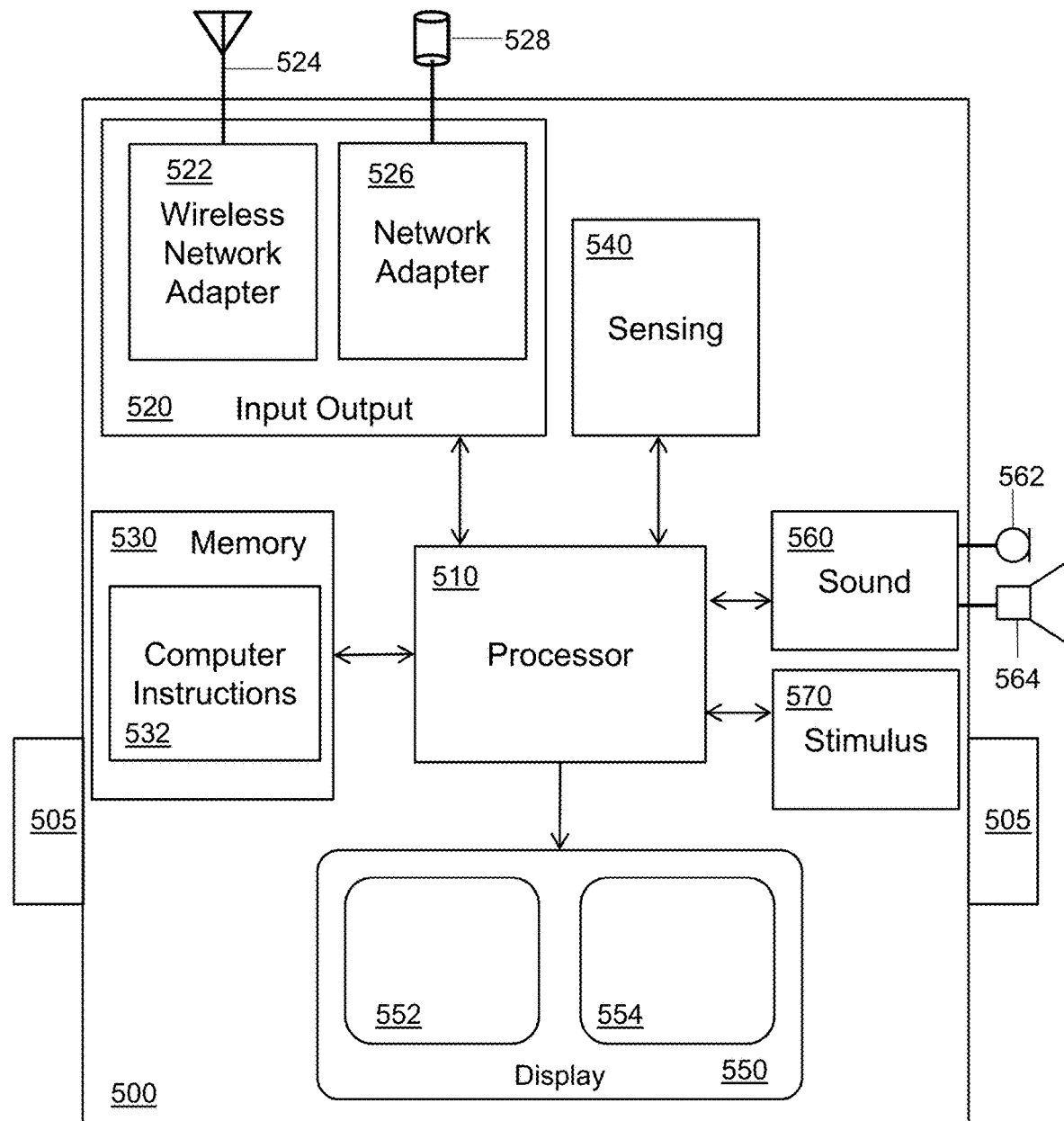
FIG. 5 shows a block diagram of an embodiment of an HR system.

FIG. 5 is a block diagram of an embodiment of an HR system 500 which may have some components implemented as part of a head-mounted assembly. The HR system 500 may be considered a computer system that can be adapted to be worn on the head, carried by hand, or otherwise attached to a user. In the embodiment of the HR system 500 shown, a structure 505 is included which is adapted to be worn on the head of a user. The structure 505 may include straps, a helmet, a hat, or any other type of mechanism to hold the HR system on the head of the user as an HMD.

The HR system 500 also includes a display 550. The structure 505 may position the display 550 in a field of view of the user. In some embodiments, the display 550 may be a stereoscopic display with two separate views of the FOV, such as view 552 for the user's left eye, and view 554 for the user's right eye. The two views 552, 554 may be shown as two images on a single display device or may be shown using separate display devices that are included in the display 550. In some embodiments, the display 550 may be transparent, such as in an augmented reality (AR) HMD. In systems where the display 550 is transparent, the view of the FOV of the real-world as seen through the display 550 by the user is composited with virtual objects that are shown on the display 550. The virtual objects may occlude real objects in the FOV as overlay elements and may themselves be transparent or opaque, depending on the technology used for the display 550 and the rendering of the virtual object. A virtual object, such as an overlay element, may be positioned in a virtual space, that could be two-dimensional or three-dimensional, depending on the embodiment, to be in the same position as an associated real object in real space. Note that if the display 550 is a stereoscopic display, two different views of the overlay element may be rendered and shown in two different relative positions on the two views 552, 554, depending on the disparity as defined by the inter-ocular distance of a viewer.

In some embodiments, the HR system 500 includes one or more sensors in a sensing block 540 to sense at least a portion of the FOV of the user by gathering the appropriate information for that sensor, for example visible light from a visible light camera, from the FOV of the user. Any number of any type of sensor, including sensors described previously herein, may be included in the sensor block 540, depending on the embodiment.

The HR system 500 may also include an I/O block 520 to allow communication with external devices. The I/O block 520 may include one or both of a wireless network adapter 522 coupled to an antenna 524 and a network adapter 526 coupled to a wired connection 528. The wired connection 528 may be plugged into a portable device, for example a mobile phone, or may be a component of an umbilical system such as used in extreme environments.

In some embodiments, the HR system 500 includes a sound processor 560 which takes input from one or microphones 562. In some HR systems 500, the microphones 562 may be attached to the user. External microphones, for example attached to an autonomous drone, may send sound data samples through wireless or wired connections to I/O block 520 instead of, or in addition to, the sound data received from the microphones 562. The sound processor 560 may generate sound data which is transferred to one or more speakers 564, which are a type of sound reproduction device. The generated sound data may be analog samples or digital values. If more than one speaker 564 is used, the sound processor may generate or simulate 2D or 3D sound placement. In some HR systems 500, a first speaker may be positioned to provide sound to the left ear of the user and a second speaker may be positioned to provide sound to the right ear of the user. Together, the first speaker and the second speaker may provide binaural sound to the user.

In some embodiments, the HR system 500 includes a stimulus block 570. The stimulus block 570 is used to provide other stimuli to expand the HR system user experience. Embodiments may include numerous haptic pads attached to the user that provide a touch stimulus. Embodiments may also include other stimuli, such as, but not limited to, changing the temperature of a glove, changing the moisture level or breathability of a suit, or adding smells to a breathing system.

The HR system 500 may include a processor 510 and one or more memory devices 530, which may also be referred to as a tangible medium or a computer readable medium. The processor 510 is coupled to the display 550, the sensing block 540, the memory 530, I/O block 520, sound block 560, and stimulus block 570, and is configured to execute the instructions 532 encoded on (i.e. stored in) the memory 530. Thus, the HR system 500 may include an article of manufacture comprising a tangible medium 530, that is not a transitory propagating signal, encoding computer-readable instructions 532 that, when applied to a computer system 500, instruct the computer system 500 to perform one or more methods described herein, thereby configuring the processor 500.

While the processor 510 included in the HR system 500 may be able to perform methods described herein autonomously, in some embodiments, processing facilities outside of that provided by the processor 510 included inside of the HR system 500 may be used to perform one or more elements of methods described herein. In one non-limiting example, the processor 510 may receive information from one or more of the sensors 540 and send that information through the wireless network adapter 522 to an external processor, such as a cloud processing system or an external server. The external processor may then process the sensor information to identify an object, such as a breadcrumb beacon, in the FOV and send information about the object, such as its shape and location in the FOV, to the processor 510 through the wireless network adapter 522. The processor 510 may then use the geometry, appearance and location of the object in the FOV to render an overlay element and show the overlay element on the display 550.

In some embodiments, the instructions 532 may instruct the HR system 500 to receive a signal from a beacon device, for example data transmitted through the wireless network adapter 522 or data from a sensor coupled to sensing block 540. The instructions 532 may further instruct the HR system 500 to determine a position of the signal source based on the received data. The instructions 532 may further instruct the HR system 500 to render a stimulus on the display 550, for example marking the position with text, rendering an image of a beacon, or providing additional information such as a visible path or arrow. Note that the instructions 532 may generate the rendering correctly oriented and scaled on the display in the visible field of view. The instructions 532 may also instruct the HR system 500 to generate data which when output on speaker 564 creates a sound placed at or near the determined position. In at least one embodiment, the instructions 532 may also instruct the HR system 500 to generate data which creates a haptic stimulus using stimulus block 570, for example indicating a push or shake in the preferred direction for the user to move in.

Aspects of various embodiments are described with reference to flowchart illustrations and/or block diagrams of methods, apparatus, systems, and computer program products according to various embodiments disclosed herein. It will be understood that various blocks of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and/or block diagrams in the figures help to illustrate the architecture, functionality, and operation of possible implementations of systems, methods and computer program products of various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 6:
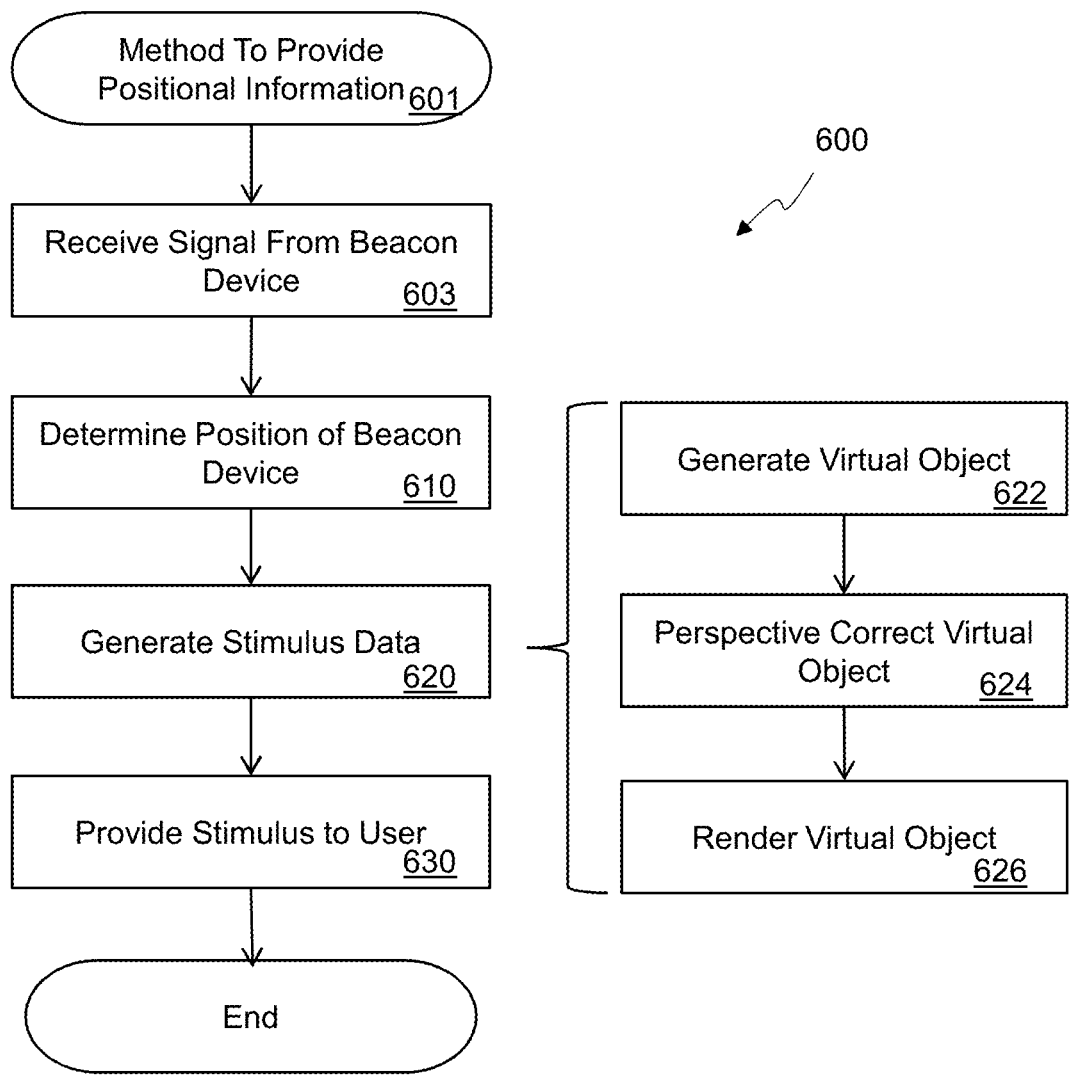
FIG. 6 is a flowchart of an embodiment of a method to provide positional information to a user of an HR system.

FIG. 6 is a flowchart 600 of an embodiment of a method to provide 601 positional information to a user of an HR system. The method starts by receiving 603 a signal at the HR system from a beacon device located in a real-world environment. In some embodiments, the HR system may transmit an activation signal to the beacon device, which may also provide energy to the beacon device. The activation signal can be any sort of energy, depending on the embodiment, and may be provided by a radio frequency transmitter to send a radio frequency signal to the beacon or provided by an ultraviolet illuminator to transmit ultraviolet light into an area around the HR system as two non-limiting examples. The signal sent by the beacon device and received by the HR system can be any type of signal, including using any type of energy, including, but not limited to, acoustic energy, visible light, or electromagnetic waves in the invisible spectrum such as radio frequency energy, ultraviolet light, or infrared light. As described above, the HR system may include any type of sensor including a sensor appropriate to receive the signal from the beacon device, such as, but not limited to, a visible light camera, an infrared detector, an array microphone, or a radio frequency receiver which may include an array antenna for directional detection. Depending on the embodiment, the signal may be continuous or intermittent; the signal may also be modulated to transmit data.

The signal is then used to determine 610 a position of the beacon device based on the signal. In some embodiments, the determining is based on more than one sample of the received signal. Depending on the embodiment, the position determined may be a physical location in the real-world environment or just a virtual location in a field of view of the HR system. A physical location may be an absolute location in real-world 3D space, or it may be a relative location. If it is a relative location, it may be a location relative to the user of the HR system, or relative to a fixed location in the real-world environment. In some embodiments, the location may be determined based on the specifics of how the signal is received, such as its location in a field of view of a camera or a direction of signal determined through use of a directional receiver. In other embodiments, the location may be determined by extracting positional information from the received signal and calculating the position of the beacon device using the positional information. One non-limiting example of this is a signal that carries information from a GPS receiver in the beacon device. In another embodiment, the position may be determined using a map indicating a precise or approximate position: in some embodiments, the map may have been created when placing the beacon device, for example by the current user of the HR system, a team member, a drone or a robotic device; in some example embodiments, the map may be preloaded into the HR system, for example indicating beacon devices fixed in the environment.

Once a position has been determined 610, the flowchart 600 continues by generating stimulus data 620. The stimulus may be a visible cue, a 3D audio cue, a positional haptic cue, or any other sort of stimulus appropriate for the embodiment and the stimulus data may be specific to the type of stimulus to be provided. For a visual cue the stimulus data may be directly based on the received signal; the stimulus data may simply be an image of the light generated by the beacon device detected by a camera of the HR system. In some cases, however, the signal provided by the beacon device may not be directly perceivable by a human, such as a partially occluded visible light, infrared light, ultraviolet light, or a radio frequency signal, so the HR system may create a virtual object 622 to indicate the position of the beacon device to the user. The virtual object may be an icon, an area in the field of view of the user having a brightness or color significantly different than a background, a virtual light beam projecting from the position of the beacon device, or any enhanced visual information presented to the user. Non-limiting examples of enhanced visual information for the user include a modulation of the visible cue based on proximity, a modulation of the visible cue based on a length of time the signal has been received from the beacon device, an indication of a path for the user to follow such as an arrow or a virtual path/road, a window showing at least one object hidden from view of the user, or textual information. Any method, technique, technology, or apparatus, can be used to determine what objects may be hidden and how they might be displayed, including, but not limited to those described in U.S. patent application Ser. No. 16/123,543 entitled Display of Hidden Information and filed on Sep. 6, 2018, which is incorporated by reference herein for any and all purposes. The virtual object may be corrected for perspective 624 using the current user position and the determined position of the beacon device and rendered 626 in a memory coupled to the HR system.

The flowchart 600 finishes by providing a stimulus 630 to the user on the HR system based on the position of the beacon device. Depending on the embodiment, this may be done by taking rendered memory data and displaying it on a display coupled to the HR system. The stimulus may be provided continuously or intermittently, depending on the embodiment.

In at least one embodiment, the method includes receiving a second signal at the HR system from a second beacon device located in the real-world environment and determining a second position of the second beacon device based on the second signal. A virtual object may be created based on both the position of the beacon device and the second position of the second beacon device and the virtual object rendered as the stimulus.

Figure 7:
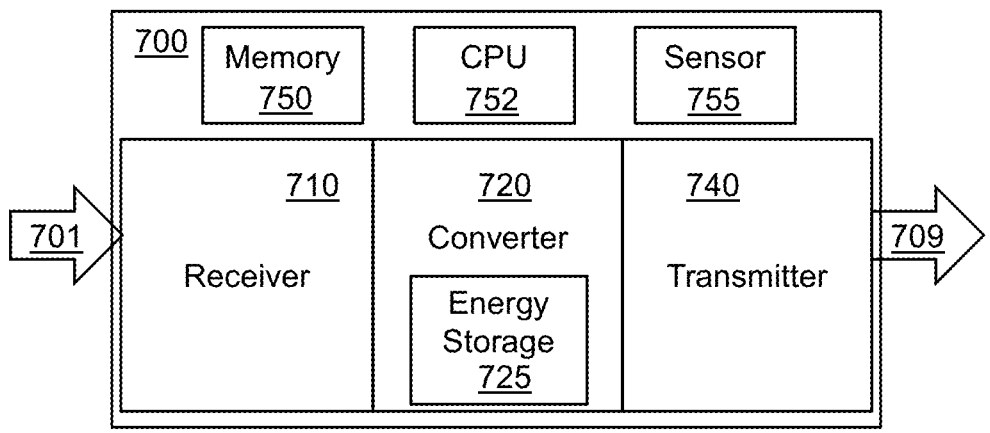
FIG. 7 shows a block diagram of an embodiment of an energy-harvesting beacon device.

FIG. 7 shows a block diagram of an embodiment of an energy-harvesting beacon device 700. The beacon device 700 includes a receiver 710 to receive a first type of energy 701, a conversion apparatus 720 to convert the first type of energy into a second type of energy, and a transmitter 740 to transmit the second type of energy 709 to a hybrid reality (HR) system. The first type of energy and the second type of energy may be any type of energy, including, but not limited to visible light, electromagnetic waves in the invisible spectrum such as radio frequency energy, ultraviolet light or infrared light, heat energy, or acoustic energy.

In some embodiments, a phosphor located on an exterior of the beacon device acts as the receiver to receive ultraviolet light energy, the conversion apparatus to convert ultraviolet light energy into visible light energy, and the transmitter to transmit the visible light energy to the HR system. In other embodiments, the receiver includes an antenna to receive a radio frequency signal or a thermal mass to absorb heat energy. Depending on the embodiment, the conversion apparatus may include circuitry to convert the radio frequency signal into visible light. This circuitry may include, for example, a rectifier to convert the alternating current radio frequency signal into direct current electrical energy and a light-emitting device, such as a light emitting diode (LED) to convert the electrical energy into visible light. In some embodiments, the conversion apparatus may include a photovoltaic cell to convert light into electrical energy or a thermoelectric generator to convert heat energy collected by the thermal mass into electrical energy and additional circuitry to convert the electrical energy into the second type of energy for the signal, such as a radio frequency signal, an audio frequency signal or visible light. Any type of thermoelectric generator may be used, depending on the embodiment, including, but not limited to, a solid-state Seeback generator, bimetallic thermocouples (which may also use the Seeback effect), or a heat engine of any type. A Seeback generator may be constructed using thermoelectric materials such as, but not limited to, bismuth telluride ($Bi_2Te_3$), lead telluride (PbTe), calcium manganese oxide ($Ca_2Mn_3O_8$), and silicon germanium (SiGe). Thermocouples may be constructed using two different metals that create a junction which generates a voltage dependent upon its temperature. Many combinations of different metals can be used to build thermocouples, including, but not limited to, nickel-chromium with nickel-alumel, iron with constantan, copper with constantan, and platinum-rhodium with platinum. Heat engines, such as an internal combustion engine, a Sterling engine, or steam engine may not be practical for many breadcrumb beacons, but miniaturized heat engines utilizing nanotechnology are being developed and such miniaturized heat engines may be applicable to breadcrumb beacons.

In some embodiments, the conversion apparatus may include a voice coil to convert the audio frequency signal into acoustic energy. Depending on the embodiment, the transmitter can include any type of transducer, mechanical device, or circuitry suitable to transmit the second type of energy as the signal to the HR system, including, but not limited to, a lens to transmit visible light, an antenna to transmit a radio frequency signal, or a speaker cone to transmit acoustical energy.

In some embodiments, the beacon device 700 also includes an energy storage apparatus 725, such a rechargeable battery or a capacitor, to store energy received over a period of time before the beacon device 700 transmits. This allows a low rate of received energy to be accumulated over time so that a higher energy rate can be used for transmission, albeit for a shorter period of time, than the rate that energy is received. In other embodiments, a burst of energy may be received over a short period of time and stored in the energy storage apparatus 724. The stored energy may then be used over a longer period of time to transmit a low energy signal.

Some embodiments of the beacon device 700 may include a memory device 750 which can store data that can then be provided to an external system modulated on the transmitted signal 709. In some embodiments, a unique ID may be pre-stored or burned into the memory device 750 at a time of manufacture which may uniquely identify the beacon device 700. In other embodiments, information may be stored into the memory device 750 at the time it is deployed to indicate its location, who deployed the device, a task-specific identifier/message, or other information. The storage of the information into the memory device 750 may be considered to take place near the time of its deployment if the storage takes place after its time and place of manufacture and within one day of its actual deployment into the environment where it will be detected by an external system. In yet another embodiment, information to be stored in the memory device 750 may be provided by a received signal, either the first type of energy 701 or another information-carrying signal such as, but not limited to, Bluetooth®, Z-Wave®, or a modulated infrared signal, received after the beacon device 700 is deployed. Information to be stored in the memory device 750 after deployment may be provided by any source, including, but not limited to, the same HR system (but at an earlier time than the second energy type 709 is received), a different HR system associated with a different user, a fixed broadcasting source, a drone, or any other external source. The information received from the external source may be any type of information, including, but not limited to, an identifier of the provider of the information, an absolute or relative location of the beacon device 700, environmental data, a message, or any combination thereof. Some embodiments may also include a CPU 752 to move data into and out of the memory device 750 and/or manage other tasks within the beacon device 700, but other embodiments may be able to access the memory device 750 without including a CPU 752.

Some embodiments of the beacon device 700 may include one or more sensors 755 to measure light, sound, temperature, humidity, toxic gases, pressure, radiation, other environmental factors, or anything else. Data from the sensor 755 may be used to modulate the signal sent to the HR device by circuitry in the beacon device 700. Data from the sensor 755 may be accessed in real-time and modulated onto the second type of energy 709 or data from the sensor 755 may be stored in the memory device 750 to be transmitted and/or processed by CPU 752 at a later time, depending on the embodiment. In some embodiments of the beacon device 700, one of the sensors 755 may be a proximity detector and circuitry, such as, but not limited to, the CPU 752, may initiate the transmitting in response to proximity of the HR system to the beacon device. The proximity detector may be any sort of active or passive proximity sensor, including a passive infrared detector to detect the presence of a person or a radio frequency receiver, which may be different than the receiver 710, to detect a radio frequency presence beacon transmitted from the HR device. Other types of presence beacons in the HR device and receivers in the beacon device 700 may be used in other embodiments, such as an ultraviolet presence beacon, an infrared presence beacon, or an acoustic presence beacon. Some embodiments of the beacon device 700 may include circuitry, such as, but not limited to, the CPU 752, that initiates the transmitting based on the received signal, such as detecting modulated information in the received signal, the presence of the received signal, or the presence of the received signal for a pre-determined period of time.

Figure 8:
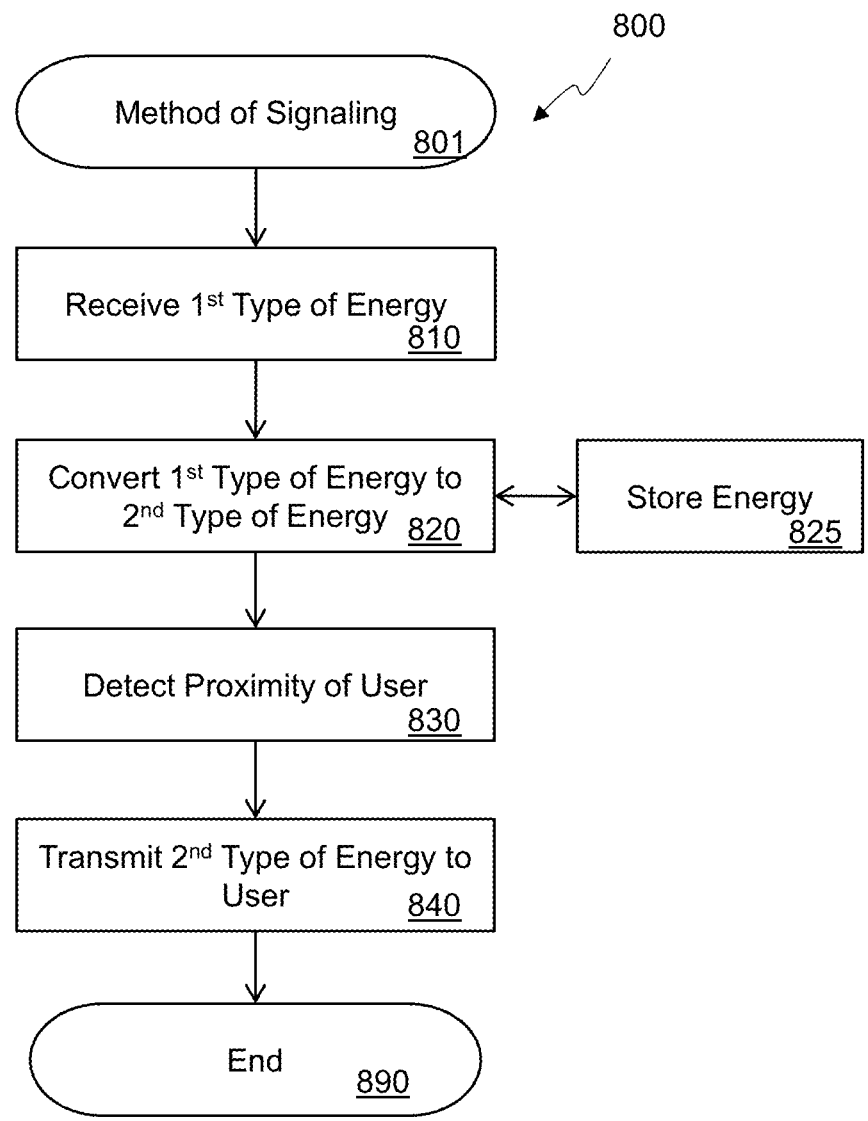
FIG. 8 is a flowchart of an embodiment of a method of signaling by an energy-harvesting beacon device.

FIG. 8 is a flowchart 800 of an embodiment of a method of signaling 801 by an energy-harvesting beacon device. The method shown in flowchart 800 may be performed by the energy-harvesting beacon device 700 of FIG. 7. The method of signaling 801 includes receiving a first type of energy 810 at a beacon device. The first type of energy may be any type of energy, including, but not limited to ultraviolet light, a radio frequency signal, or heat energy. The first type of energy is converted 820 into a second type of energy. The converting may be performed by a phosphor, circuitry, or any other mechanism in the beacon device. The second type of energy may be any type of energy, including, but not limited to, visible light, infrared light, ultraviolet light, a radio frequency signal, or acoustic energy. In some embodiments, the method may include storing energy 825 which may be received as the first type of energy at the beacon device over a first period of time having a first length. The energy stored may be the first type of energy, the second type of energy, or another type of energy, such as electrical energy, that is created from the first type of energy and then later used to create the second type of energy. In some embodiments, the method may include detecting a proximity of the HR system 830. This may be done after sufficient energy is stored in beacon device.

The flowchart 800 also includes transmitting the second type of energy 890 to indicate a position of the beacon device in a real-world environment to a hybrid reality (HR) system. In some embodiments, the transmitting of the second type of energy may be done for length of time that is less than a length of time that the first type of energy has been received and stored. In such embodiments, the transmitting may have a higher rate of energy transfer than the receiving. In some embodiments, the transmitting may be performed the transmitting in response to the proximity of HR system. In some embodiments, the transmitted signal may be modulated to provide information, for example a beacon ID, a GPS position, sensor data, or proximity distance; the information may be hard-wired into the beacon device, gathered by circuitry and sensors in the beacon device, or transmitted to the beacon device from an external actor.

As will be appreciated by those of ordinary skill in the art, aspects of the various embodiments may be embodied as a system, device, method, or computer program product apparatus. Accordingly, elements of the present disclosure may take the form of an entirely hardware embodiment, an entirely software embodiment (including firmware, resident software, micro-code, or the like) or an embodiment combining software and hardware aspects that may all generally be referred to herein as a "server," "circuit," "module," "client," "computer," "logic," or "system," or other terms. Furthermore, aspects of the various embodiments may take the form of a computer program product embodied in one or more computer-readable medium(s) having computer program code stored thereon.

Any combination of one or more computer-readable storage medium(s) may be utilized. A computer-readable storage medium may be embodied as, for example, an electronic, magnetic, optical, electromagnetic, infrared, or semiconductor system, apparatus, or device, or other like storage devices known to those of ordinary skill in the art, or any suitable combination of computer-readable storage mediums described herein. In the context of this document, a computer-readable storage medium may be any tangible medium that can contain, or store a program and/or data for use by or in connection with an instruction execution system, apparatus, or device. Even if the data in the computer-readable storage medium requires action to maintain the storage of data, such as in a traditional semiconductor-based dynamic random access memory, the data storage in a computer-readable storage medium can be considered to be non-transitory. A computer data transmission medium, such as a transmission line, a coaxial cable, a radio-frequency carrier, and the like, may also be able to store data, although any data storage in a data transmission medium can be said to be transitory storage. Nonetheless, a computer-readable storage medium, as the term is used herein, does not include a computer data transmission medium.

Computer program code for carrying out operations for aspects of various embodiments may be written in any combination of one or more programming languages, including object oriented programming languages such as Java, Python, C++, or the like, conventional procedural programming languages, such as the "C" programming language or similar programming languages, or low-level computer languages, such as assembly language or microcode. The computer program code if loaded onto a computer, or other programmable apparatus, produces a computer implemented method. The instructions which execute on the computer or other programmable apparatus may provide the mechanism for implementing some or all of the functions/acts specified in the flowchart and/or block diagram block or blocks. In accordance with various implementations, the program code may execute entirely on the user's computer, partly on the user's computer, as a stand-alone software package, partly on the user's computer and partly on a remote computer or entirely on the remote computer or server, such as a cloud-based server. In the latter scenario, the remote computer may be connected to the user's computer through any type of network, including a local area network (LAN) or a wide area network (WAN), or the connection may be made to an external computer (for example, through the Internet using an Internet Service Provider). The computer program code stored in/on (i.e. embodied therewith) the non-transitory computer-readable medium produces an article of manufacture.

The computer program code, if executed by a processor causes physical changes in the electronic devices of the processor which change the physical flow of electrons through the devices. This alters the connections between devices which changes the functionality of the circuit. For example, if two transistors in a processor are wired to perform a multiplexing operation under control of the computer program code, if a first computer instruction is executed, electrons from a first source flow through the first transistor to a destination, but if a different computer instruction is executed, electrons from the first source are blocked from reaching the destination, but electrons from a second source are allowed to flow through the second transistor to the destination. So a processor programmed to perform a task is transformed from what the processor was before being programmed to perform that task, much like a physical plumbing system with different valves can be controlled to change the physical flow of a fluid.

Some examples of embodiments are listed below:

Embodiment 1

A method to provide positional information to a user of a hybrid reality (HR) system, the method comprising receiving a signal at the HR system from a beacon device located in a real-world environment, determining a position of the beacon device based on the signal, and providing a stimulus to the user on the HR system based on the position of the beacon device.

Embodiment 2

The method of embodiment 1, further comprising transmitting an activation signal to the beacon device to provide energy to the beacon device.

Embodiment 3

The method of embodiment 1, the position comprising a physical location in the real-world environment.

Embodiment 4

The method of embodiment 3, the physical location comprising a location relative to the user.

Embodiment 5

The method of embodiment 3, the physical location comprising a location relative to a fixed location in the real-world environment.

Embodiment 6

The method of embodiment 3, further comprising extracting positional information from the received signal, and calculating the position of the beacon device using the positional information.

Embodiment 7

The method of embodiment 1, the position comprising a virtual location in a field of view of the HR system.

Embodiment 8

The method of embodiment 1, wherein the signal comprises visible light.

Embodiment 9

The method of embodiment 1, wherein the signal comprises electromagnetic energy in the invisible spectrum.

Embodiment 10

The method of embodiment 1, wherein the signal comprises acoustic energy.

Embodiment 11

The method of embodiment 1, wherein the signal is continuous.

Embodiment 12

The method of embodiment 1, wherein the signal is intermittent.

Embodiment 13

The method of embodiment 1, wherein the signal transmits data.

Embodiment 14

The method of embodiment 1, wherein the stimulus is provided continuously.

Embodiment 15

The method of embodiment 1, wherein the stimulus is provided intermittently.

Embodiment 16

The method of embodiment 1, the stimulus comprising a visible cue.

Embodiment 17

The method of embodiment 16, the visible cue comprising an area in the field of view of the user having a brightness or color significantly different than a background.

Embodiment 18

The method of embodiment 16, the visible cue comprising a virtual light beam projecting from the position of the beacon device.

Embodiment 19

The method of embodiment 16, the visible cue comprising enhanced visual information for the user.

Embodiment 20

The method of embodiment 19, the enhanced visual information for the user comprising a modulation of the visible cue based on proximity.

Embodiment 21

The method of embodiment 19, the enhanced visual information for the user comprising a modulation of the visible cue based on a length of time the signal has been received from the beacon device.

Embodiment 22

The method of embodiment 19, the enhanced visual information for the user comprising an indication of a path for the user to follow.

Embodiment 23

The method of embodiment 19, the enhanced visual information for the user comprising an a window showing at least one object hidden from view of the user.

Embodiment 24

The method of embodiment 19, the enhanced visual information for the user comprising textual information.

Embodiment 25

The method of embodiment 1, the stimulus comprising a 3D audio cue.

Embodiment 26

The method of embodiment 1, the stimulus comprising a positional haptic cue.

Embodiment 27

The method of embodiment 1, further comprising receiving a second signal at the HR system from a second beacon device located in the real-world environment, determining a second position of the second beacon device based on the second signal, creating a virtual object based on both the position of the beacon device and the second position of the second beacon device, and rendering the virtual object as the stimulus.

Embodiment 28

The method of embodiment 27, wherein the virtual object is shaped to provide an indication of a path for the user to follow.

Embodiment 29

The method of embodiment 1, wherein the determining is based on more than one sample of the received signal.

Embodiment 30

An article of manufacture comprising a tangible medium, that is not a transitory propagating signal, encoding computer-readable instructions that, when applied to a computer system, instruct the computer system to perform a method comprising receiving a signal at a hybrid reality (HR) system from a beacon device located in a real-world environment, wherein the HR system comprises the computer system, determining a position of the beacon device based on the signal, and providing a stimulus to a user on the HR system based on the position of the beacon device.

Embodiment 31

A head-mounted display (HMD) comprising a display, a structure, coupled to the display and adapted to position the display in a field-of-view (FOV) of the user, and a processor, coupled to the display, the processor configured to receive a signal at the HMD from a beacon device located in a real-world environment, determine a position of the beacon device based on the signal, and provide a stimulus to a user on the HMD based on the position of the beacon device.

Embodiment 32

A method of signaling comprising receiving a first type of energy at a beacon device, converting the first type of energy into a second type of energy, and transmitting the second type of energy to indicate a position of the beacon device in a real-world environment to a hybrid reality (HR) system.

Embodiment 33

The method of embodiment 32, wherein the first type of energy comprises ultraviolet light, the second type of energy comprises visible light, and the converting is performed by a phosphor.

Embodiment 34

The method of embodiment 32, wherein the first type of energy comprises a radio frequency signal, and the second type of energy comprises visible light.

Embodiment 35

The method of embodiment 32, wherein the first type of energy comprises heat, and the second type of energy comprises visible light.

Embodiment 36

The method of embodiment 32, wherein the first type of energy comprises heat, and the second type of energy comprises a radio frequency signal.

Embodiment 37

The method of embodiment 32, wherein the first type of energy comprises heat, and the second type of energy comprises a acoustical energy.

Embodiment 38

The method of embodiment 32, further comprising storing energy received as the first type of energy at the beacon device over a first period of time having a first length, and the transmitting of the second type of energy done for a second length of time that is different than the first length, wherein the transmitting has a different rate of energy transfer than the receiving.

Embodiment 39

The method of embodiment 38, further comprising detecting a proximity of the HR system at a time after the first period of time, and performing the transmitting in response to the proximity of HR system.

Embodiment 40

The method of embodiment 32, further comprising obtaining information at the beacon device, and modulating the information on the second type of energy to provide the information to the HR system.

Embodiment 41

The method of embodiment 40, the obtaining information comprising retrieving the information from a storage location on the beacon device.

Embodiment 42

The method of embodiment 40, the obtaining information comprising receiving the information from a sensor of the beacon device.

Embodiment 43

The method of embodiment 42, wherein the sensor measures a temperature, a gas concentration, or a location.

Embodiment 44

The method of embodiment 41, further comprising storing the information in the storage location near a time that the beacon device is deployed.

Embodiment 45

The method of embodiment 41, further comprising receiving the information from an external device after the beacon device has been deployed, and storing the information in the storage location on the beacon device.

Embodiment 46

A beacon device comprising a receiver to receive a first type of energy, a conversion apparatus to convert the first type of energy into a second type of energy, and a transmitter to transmit the second type of energy to a hybrid reality (HR) system.

Embodiment 47

The beacon device of embodiment 56, wherein a phosphor located on an exterior of the beacon device comprises the receiver to receive ultraviolet light energy, the conversion apparatus to convert ultraviolet light energy into visible light energy, and the transmitter to transmit the visible light energy to the HR system.

Embodiment 48

The beacon device of embodiment 56, the receiver comprising an antenna to receive a radio frequency signal, the conversion apparatus comprising circuitry to convert the radio frequency signal into visible light, and the transmitter comprising a lens to transmit the visible light to the HR system.

Embodiment 49

The beacon device of embodiment 56, the receiver comprising a thermal mass to absorb heat energy, the conversion apparatus comprising a thermoelectric generator to convert heat energy into electrical energy and a light emitting device to convert the electrical energy into visible light, and the transmitter comprising a lens to transmit the visible light to the HR system.

Embodiment 50

The beacon device of embodiment 56, the receiver comprising a thermal mass to absorb heat energy, the conversion apparatus comprising a thermoelectric generator to convert heat energy into electrical energy and circuitry to convert the electrical energy into a radio frequency signal, and the transmitter comprising an antenna to transmit the radio frequency signal to the HR system.

Embodiment 51

The beacon device of embodiment 56, the receiver comprising a thermal mass to absorb heat energy, the conversion apparatus comprising a thermoelectric generator to convert heat energy into electrical energy, circuitry to convert the electrical energy into an audio frequency signal, and a voice coil to convert the audio frequency signal into acoustic energy, and the transmitter comprising a speaker cone to transmit the acoustical energy to the HR system.

Embodiment 52

The beacon device of embodiment 56, further comprising an energy storage apparatus.

Embodiment 53

The beacon device of embodiment 62, further comprising a proximity detector and circuitry to initiate the transmitting in response to proximity of the HR system to the beacon device.

Embodiment 54

The beacon device of embodiment 56, further comprising a sensor and circuitry to modulate information from the sensor on the second type of energy transmitted to the HR system.

Embodiment 55

The beacon device of embodiment 56, further comprising a memory device and circuitry to modulate information retrieved from the memory device on the second type of energy transmitted to the HR system.

Embodiment 56

A system comprising a head-mounted display (HMD) and one or more beacon devices, a beacon device of the one or more beacon devices comprising a receiver to receive a first type of energy, a conversion apparatus to convert the first type of energy into a second type of energy, and a transmitter to transmit the second type of energy to the HMD, the HMD comprising a display, a structure coupled to the display and adapted to position the display in a field-of-view (FOV) of the user, a sensor to receive the second type of energy from the beacon device, and a processor coupled to the display, the processor programmed to receive the second type of energy from the beacon device located in a real-world environment, determine a position of the beacon device based on the second type of energy received from the beacon device, and provide a stimulus to a user on the HMD based on the position of the beacon device.

Embodiment 57

The system of embodiment 56, the beacon device including a phosphor located on an exterior of the beacon device, the phosphor comprising the receiver to receive ultraviolet light energy, the conversion apparatus to convert ultraviolet light energy into visible light, and the transmitter to transmit the visible light to the HMD, and the HMD further comprising an ultraviolet illuminator to transmit ultraviolet light into an area around the HMD, and a visible light camera to receive the visible light from the beacon device.

Embodiment 58

The system of embodiment 56, the beacon device including an antenna to receive a radio frequency signal from the HMD, circuitry to convert the radio frequency signal into visible light, and a lens to transmit the visible light to the HMD, and the HMD further comprising a radio frequency transmitter to send the radio frequency signal to the beacon, and a visible light camera to receive the visible light from the beacon device.

Embodiment 59

The system of embodiment 56, the beacon device including a thermal mass to absorb heat energy, a thermoelectric generator to convert heat energy into electrical energy, a light emitting device to convert the electrical energy into visible light, and a lens to transmit the visible light to the HMD, and the HMD further comprising a visible light camera to receive the visible light from the beacon device.

Embodiment 60

The system of embodiment 56, the beacon device including a thermal mass to absorb heat energy, a thermoelectric generator to convert heat energy into electrical energy, circuitry to convert the electrical energy a radio frequency signal, and an antenna to transmit the radio frequency signal to the HMD, and the HMD further comprising a radio frequency receiver to receive the radio frequency signal from the beacon device.

Embodiment 61

The system of embodiment 56, the beacon device including a thermal mass to absorb heat energy, a thermoelectric generator to convert heat energy into electrical energy, circuitry to convert the electrical energy an audio frequency signal, a voice coil to convert the audio frequency signal into acoustic energy, and a speaker cone to transmit the acoustical energy to the HMD, and the HMD further comprising an array microphone to receive the acoustical energy from the beacon device.

Embodiment 62

The system of embodiment 56, the beacon device further comprising an environmental sensor and circuitry to modulate information from the environmental sensor on the second type of energy transmitted to the HMD.

Embodiment 63

The system of embodiment 56, the beacon device further comprising an energy storage apparatus.

Embodiment 64

The system of embodiment 62, the beacon device further comprising a proximity detector and circuitry to initiate the transmitting in response to proximity of the HMD to the beacon device.

Embodiment 65

The system of embodiment 62, the HMD further comprising a presence beacon to transmit a location-limited signal announcing a presence of the HMD, and the beacon device further comprising a detector to detect the location-limited signal and circuitry to initiate the transmitting in response to the detection of the location-limited signal.

Embodiment 66

The system of embodiment 56, the beacon device further comprising a memory device and circuitry to modulate information retrieved from the memory device on the second type of energy transmitted to the HR system.

Embodiment 67

The system of embodiment 56, the position comprising a physical location in the real-world environment.

Embodiment 68

The system of embodiment 56, the position comprising a virtual location in a field of view of the HMD.

Embodiment 69

The system of embodiment 56, wherein the stimulus is provided continuously by the HMD.

Embodiment 70

The system of embodiment 56, wherein the stimulus is provided intermittently by the HMD.

Embodiment 71

The system of embodiment 56, the stimulus comprising a visible cue on the display of the HMD.

Embodiment 72

The system of embodiment 71, the visible cue comprising an area in the field of view of the user having a brightness or color significantly different than a background.

Embodiment 73

The system of embodiment 71, the visible cue comprising virtual light beams projecting from the position of the beacon device.

Embodiment 74

The system of embodiment 71, the visible cue comprising enhanced visual information for the user.

Embodiment 75

The system of embodiment 74, the enhanced visual information for the user comprising a modulation of the visible cue based on proximity.

Embodiment 76

The system of embodiment 74, the enhanced visual information for the user comprising an indication of a path for the user to follow.

Embodiment 77

The system of embodiment 74, the enhanced visual information for the user comprising a window showing at least one object hidden from view of the user.

Embodiment 78

The system of embodiment 74, the enhanced visual information for the user comprising textual information.

Embodiment 79

The system of embodiment 56, the stimulus comprising a 3D audio cue.

Embodiment 80

The system of embodiment 56, the processor of the HMD further programmed to receive a signal from a second beacon device of the one or more beacon devices located in the real-world environment, determine a second position of the second beacon device based on the signal, create a virtual object based on both the position of the beacon device and the second position of the second beacon device, and render the virtual object as the stimulus.

Embodiment 81

The system of embodiment 80, wherein the virtual object is shaped to provide an indication of a path for a user of the HMD to follow.

Unless otherwise indicated, all numbers expressing quantities, properties, measurements, and so forth, used in the specification and claims are to be understood as being modified in all instances by the term "about." The recitation of numerical ranges by endpoints includes all numbers subsumed within that range, including the endpoints (e.g. 1 to 5 includes 1, 2.78, π, $3.\overline{33}$, 4, and 5).

As used in this specification and the appended claims, the singular forms "a", "an", and "the" include plural referents unless the content clearly dictates otherwise. Furthermore, as used in this specification and the appended claims, the term "or" is generally employed in its sense including "and/or" unless the content clearly dictates otherwise. As used herein, the term "coupled" includes direct and indirect connections. Moreover, where first and second devices are coupled, intervening devices including active devices may be located there between.

The description of the various embodiments provided above is illustrative in nature and is not intended to limit this disclosure, its application, or uses. Thus, different variations beyond those described herein are intended to be within the scope of embodiments. Such variations are not to be regarded as a departure from the intended scope of this disclosure. As such, the breadth and scope of the present disclosure should not be limited by the above-described exemplary embodiments, but should be defined only in accordance with the following claims and equivalents thereof.

What is claimed is:

1. A method to provide positional information to a user of a hybrid reality (HR) system, the method comprising:
   receiving a plurality of signals at a first sensor of the HR system respectively from a plurality of beacon devices located along a path through a real-world environment, wherein the plurality of signals are invisible to the user;
   determining positions of the plurality of beacon devices based on the signals;
   rendering an image of a plurality of virtual light beams respectively projecting from the positions of the plurality of beacon devices on a display of the HR system showing the path through the real-world environment in a field of view of the user; and
   modulating the plurality of virtual light beams based on a length of time that the respective plurality of signals have been received from the respective plurality of beacon devices.

2. The method of claim 1, further comprising transmitting an activation signal to at least one beacon device of the plurality of beacon devices to provide energy to the at least one beacon device.

3. The method of claim 1, the positions comprising physical locations in the real-world environment.

4. The method of claim 1, the positions comprising virtual locations in a field of view of the HR system.

5. The method of claim 1, further comprising rendering a virtual image of at least one object hidden from view of the user on the display of the HR system.

6. The method of claim 1, further comprising rendering textual information on the display of the HR system.

7. The method of claim 1, further comprising providing a 3D audio cue to the user using two or more transducers of the HR system, a virtual position of the 3D audio cue based on the positions of the plurality of beacon devices.

8. The method of claim 1, further comprising;
ascertaining that the user is not on the path based on the positions of the plurality of beacon devices with respect to the HR system; and
providing a positional haptic cue to the user using a haptic transducer of the HR system in response to said ascertaining, the positional haptic cue indicating a direction toward the path to the user.

9. The method of claim 1, further comprising:
determining a location for a virtual object based on the positions of the plurality of beacon devices with respect to the HR system; and
rendering the virtual object at the location on the display of the HR system.

10. The method of claim 9, wherein the virtual object is shaped to provide an indication of the path for the user to follow.

11. An article of manufacture comprising a tangible medium, that is not a transitory propagating signal, encoding computer-readable instructions that, when applied to a computer system, instruct the computer system to perform a method comprising:
receiving a plurality of signals at a first sensor of a hybrid reality (HR) system respectively from a plurality of beacon devices located along a path through a real-world environment, wherein the plurality of signals are invisible to a user of the HR system;
determining positions of the plurality of beacon devices based on the signals;
rendering an image of a plurality of virtual light beams respectively projecting from the positions of the plurality of beacon devices on a display of the HR system showing the path through the real-world environment in a field of view of the user; and
modulating the plurality of virtual light beams based on a length of time that the respective plurality of signals have been received from the respective plurality of beacon devices.

12. A head-mounted display (HMD) comprising:
a display;
a structure, coupled to the display and adapted to position the display in a field of view (FOV) of a user;
a sensor; and
a processor, coupled to the display and the sensor, the processor configured to:
receive a plurality of signal using the sensor, at the HMD respectively from a plurality of beacon devices located along a path through a real-world environment, wherein the plurality of signals are invisible to the user;
determine positions of the plurality of beacon devices based on the signals;
render an image of a plurality of virtual light beams respectively projecting from the positions of the plurality of beacon devices on the display showing the path through the real-world environment in the field of view of the user; and
modulate the plurality of virtual light beams based on a length of time that the respective plurality of signals have been received from the respective plurality of beacon devices.

13. The HMD of claim 12, further comprising a first audio output and a second audio output, both coupled to the processor, and configured to provide binaural audio to the user, wherein the processor is further configured to:
provide a 3D audio cue to the user through the first audio output and the second audio output, a virtual position of the 3D audio cue based on the positions of the plurality of beacon devices.

* * * * *